United States Patent
Silva Martins et al.

(10) Patent No.: US 12,375,445 B1
(45) Date of Patent: Jul. 29, 2025

(54) MANAGED ACTIVATION OF LICENSED SOFTWARE

(71) Applicant: Amazon Technologies, Inc., Seattle, WA (US)

(72) Inventors: Willian Silva Martins, Mountain View, CA (US); Ramapulla Reddy Chennuru, Milpitas, CA (US); Sambodhi Chakrabarty, Folsom, CA (US); Juveria Kanodia, Saratoga, CA (US); Srinivasan Ramkumar, San Jose, CA (US); Sree Sunku, Seattle, WA (US); Raviprasad V Mummidi, Mountain View, CA (US); Nidhi Harish Panpalia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 321 days.

(21) Appl. No.: 18/082,728

(22) Filed: Dec. 16, 2022

(51) Int. Cl.
  *H04L 9/40* (2022.01)
  *G06F 21/10* (2013.01)
  *H04L 61/4511* (2022.01)

(52) U.S. Cl.
  CPC ............ *H04L 63/02* (2013.01); *G06F 21/101* (2023.08); *H04L 61/4511* (2022.05)

(58) Field of Classification Search
  None
  See application file for complete search history.

(56) References Cited

U.S. PATENT DOCUMENTS

| | | | | |
|---|---|---|---|---|
| 10,579,830 | B1 * | 3/2020 | Bendersky | G06F 21/602 |
| 2020/0344229 | A1 * | 10/2020 | Srivastava | G06F 21/105 |
| 2022/0179673 | A1 * | 6/2022 | Kowalczyk | G06F 21/64 |
| 2022/0198070 | A1 * | 6/2022 | Hunt | G06F 21/53 |
| 2023/0179634 | A1 * | 6/2023 | Seaborn | H04L 63/101 |
| | | | | 726/1 |

(Continued)

OTHER PUBLICATIONS

Dalheimer, Mathias et al. GenLM: License Management for Grid and Cloud Computing Environments. 9th IEEE / ACM International Symposium on Cluster Computing and the Grid. 2009. IEEE. pp. 132-139. (Year: 2009).*

(Continued)

*Primary Examiner* — Jeffrey R Swearingen
(74) *Attorney, Agent, or Firm* — Perilla Knox & Hildebrandt LLP; Thomas B. Hildebrandt

(57) ABSTRACT

Techniques for a license manager service of a cloud system to provide users with the ability to activate and run licensed applications in the cloud system. Manually tracking the usage of software licenses for licensed applications can be cumbersome and error-prone. Further, the process of activating the licenses for third-party applications may be difficult or impossible depending on the activation protocols and procedures put in place by the application providers. The license manager may provide users with the ability to activate and use licensed applications, and may further provide users with a managed experience for activating the licenses for the applications. The license manager may launch licensed applications on virtual resources in a user's VPC, manage the process for activating the licensed applications with third-party providers, and provide the users with access to licensed applications that have been activated and configured by the license manager.

20 Claims, 16 Drawing Sheets

(56) References Cited

U.S. PATENT DOCUMENTS

2024/0397354 A1\* 11/2024 Lunardi ............... H04W 24/08

OTHER PUBLICATIONS

McIntyre, Joe. IBM SmartCloud: Becoming a Cloud Service Provider. IBM Redbooks, Dec. 13, 2012. 50 pages. (Year: 2012).\*
McRoberts, Malcolm. Software Licensing in the Cloud Age: Solving the Impact of Cloud Computing on Software Licensing Models. International Journal of Soft Computing and Software Engineering, vol. 3 No. 3. Mar. 2013. pp. 395-402. (Year: 2013).\*

\* cited by examiner

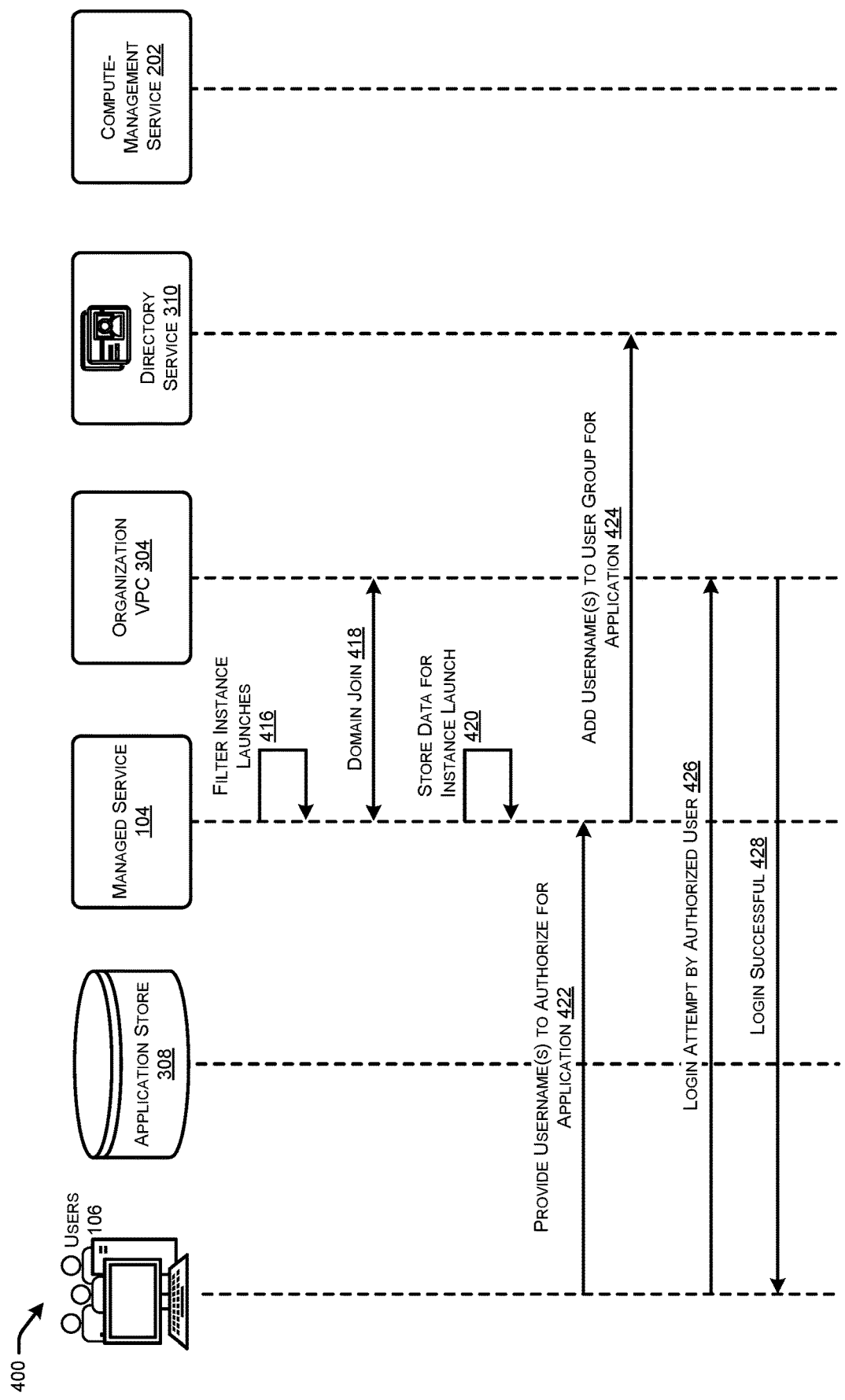

MANAGED ACTIVATION OF LICENSED SOFTWARE

BACKGROUND

Cloud providers offer cloud-based services to fulfill users' computing-service needs without the users having to invest in and maintain computing infrastructure required to implement their services. These cloud providers maintain networks of managed computing resources and functionality to implement various types of scalable, on-demand services, to support applications of the users. Specifically, the cloud providers may maintain networks of data centers, which in turn may include a number of interconnected computing devices (or "servers"), that provide computing resources to support applications of the users. Users may be provided with logically isolated portions of the cloud provider network, often referred to as virtual networks or virtual private clouds (VPCs), in which they can launch resources to support their applications. Users of cloud systems can launch and run various types of applications on scalable resources in their VPCs, such as their own proprietary applications, cloud-native applications provided by the cloud provider, and third-party applications provided by third-party developers. Because VPC constructs provide isolation and security to users by preventing others from accessing their VPCs, the users generally have to personally manage various aspects around the resources and applications in their VPCs. However, with such a wide variety of applications running in the cloud system, it can take a great deal of time and expertise for users to launch, configure, and manage applications running in their VPCs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 4A and 4B collectively illustrate a sequence diagram of an example process for a managed service to use a cross-account ENI to launch and configure a directory service in the user account to assign user accounts to application instances.

DETAILED DESCRIPTION

Figure 1:
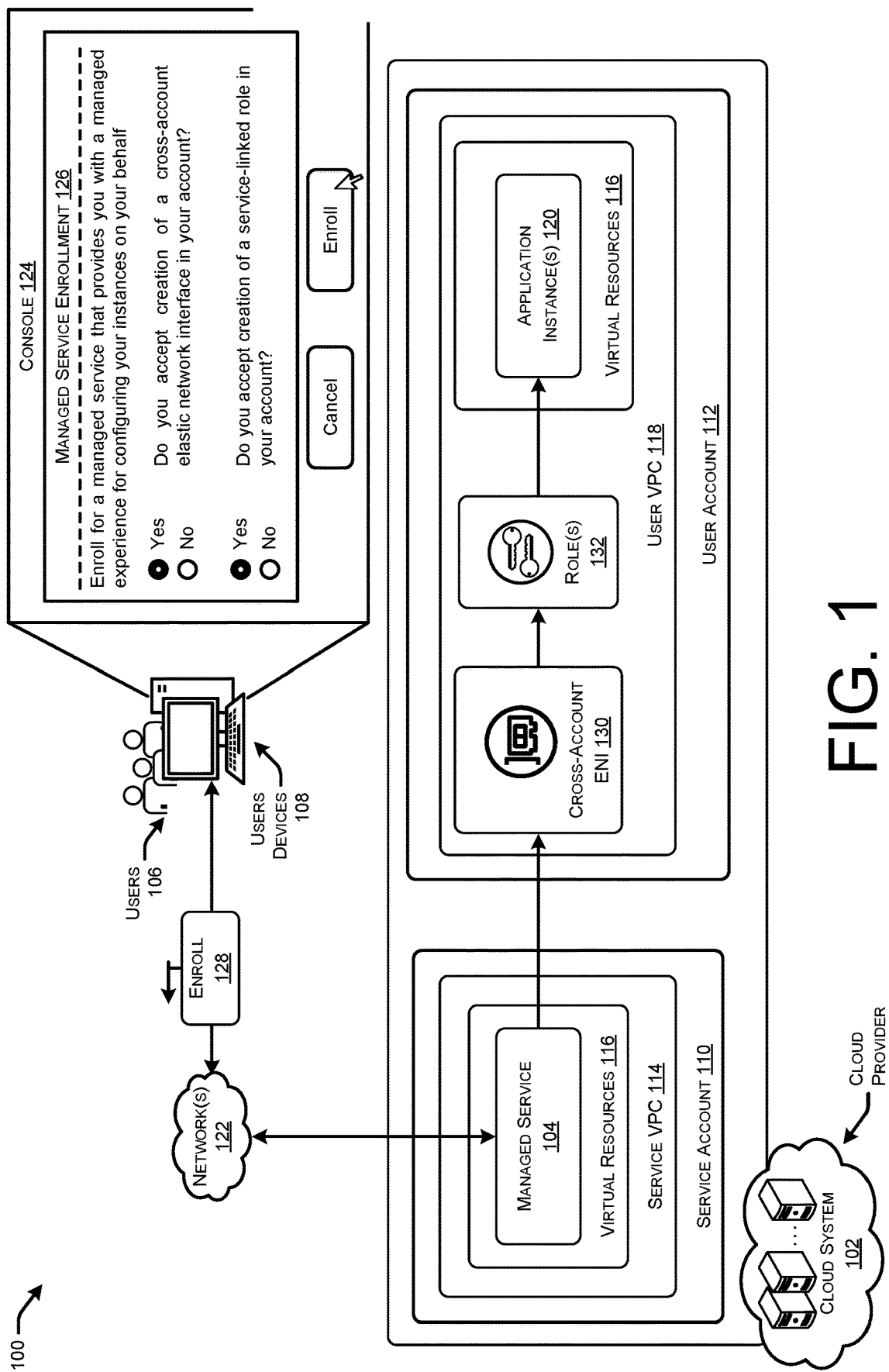
FIG. 1 illustrates a system-architecture diagram of an example environment in which a managed service in a service account uses a cross-account elastic network interface (ENI) to reach into a user account and make configuration changes to instances.

This disclosure describes techniques for managed services of cloud systems to provide managed experiences for users by automating aspects of provisioning, configuring, and managing applications running on resources of the cloud systems. To automate aspects of these management operations, the managed services may create cross-account elastic network interfaces (ENIs) that serve as attachments between VPCs in service accounts and VPCs in user accounts. These cross-account ENIs allow the managed services to "reach" into the VPCs in user accounts and perform various management operations to provide automated experiences for users. The users may define or provide a set of permissions, or roles, that the managed services may assume while in the user account. The permissions define types of management operations that the managed services are permitted to take, and/or not permitted to take, as the managed services provide the automated management experiences. As a specific example, the cloud system may provide a license manager service that helps users manage software licenses for the applications running in their VPCs. Using the cross-account ENIs, the license manager may be able to perform additional management operations on behalf of users, such as launching applications on virtual resources, configuring the virtual resources and applications, activating the licenses for the applications, and assigning authorized users for use of the licensed applications.

Further, this disclosure describes techniques for the license manager service of the cloud system to provide users with the ability to activate and run licensed applications in the cloud system. Manually tracking the usage of software licenses for licensed applications can be cumbersome and error-prone. Further, the process of activating the licenses for third-party applications (e.g., applications developed by entities other than the cloud provider and the users) may be difficult or impossible depending on the activation protocols and procedures put in place by the application providers. The license manager may provide users with the ability to use licensed applications, and may further provide users with a managed experience for activating the licenses for the applications. The license manager may launch licensed applications on virtual resources in a user's VPC, manage the process for activating the licensed applications with third-party providers, and provide the user with access to licensed applications that have been activated and configured by the license manager.

Users may opt in or enroll for managed experiences provided by different managed services of the cloud system. The managed services may provide different types of automated, or semi-automated, services for users, such as managed security services, managed incident management services, managed availability services, managed resiliency services, managed compliance services, license manager services, and so forth. Traditionally, managed services have been unable to perform certain types of management operations in user accounts, such as actually configuring resources or applications in user accounts, terminating resources or applications, and so forth. Rather, the managed services have been limited to simple operations, such as read operations to obtain listings or descriptions of instances in customer accounts. According to the techniques described herein, users may enroll for more managed and automated experiences than those traditionally provided by managed services. For example, users may request that managed services perform additional management operations, such as launching instances, configuring instances, activating licenses of licensed applications, terminating instances, and so forth.

Managed services generally run as service instances in service accounts that are maintained by cloud providers. However, the service instances running in service accounts traditionally have been unable to "reach" into, or have access to, user accounts due to various constraints. That is, various cross-account management operations have been disallowed or were not previously possible. According to the techniques described herein, when users opt in for a more managed experience from a managed service, the managed services may request permission from the user to install a cross-account ENI in an account of the user. The cross-account ENI allows the attachment or association of ENIs between VPCs in different accounts of the cloud system. The cross-account ENI may act as a virtual network card that runs in the user account and is accessible by a service instance running in a service account. The cross-account ENI may allow for managed service providers to deliver managed solutions where the managed service and user of the managed service are in different accounts.

In addition to creating a cross-account ENI, the managed service may further request that the user allow for a set of permissions be created for the managed service (also referred to herein as a "service-linked role"). The user may grant the request, and the managed service may create the set of permissions, or the service-linked role, in the user account that the managed service may assume when performing management operations in the user account.

Once the cross-account ENI and set of permissions are created in the enrolled user account, the managed service may begin performing various management operations. For instance, managed services may access the cross-account ENI and assume the permissions or role to perform operations such as launching virtual instances (e.g., virtual machines (VMs), containers, etc.), provisioning applications on virtual instances, configuring virtual instances and/or applications, assigning user accounts to the applications (e.g., mapping user accounts to instances/applications in a service directory), activating licenses for licensed applications, terminating instances or applications, and so forth. However, additional management operations may be performed based on the managed service for which the user account has enrolled, such security operations (e.g., blocking traffic, removing permissions from accounts, etc.), availability operations (e.g., creating fallback resources, adding availability zones, etc.), and/or other operations.

In an example where the managed service is a license manager, the license manager may manage the activation of licensed applications, and may further configure the licensed applications to allow access to permitted user accounts. The cloud system may offer organization accounts that allow organizational users (e.g., enterprises, companies, groups of users, etc.) to create user accounts that are managed by administrators of the organization account. For instance, companies may register for one or more organization accounts under which individual user accounts are created for employees of the companies. The organization accounts allow for administrators of those accounts to allocate resources, group accounts, and apply governance policies to accounts or groups.

These organization accounts may desire that the license manager provision licensed applications and activate the licensed applications with third-party providers of the software. The organization account may request that the license manager provision a new instance of a licensed application on behalf of one or more user accounts included in the organization account. The license manager may launch a virtual resource (e.g., VM, container, etc.), or detect a launch of a virtual resource, on which the licensed application is installed. The license manager may configure the licensed application to send activation requests to an activation firewall that is configured to allow or deny activations requests. For instance, the licensed application may be configured to send activation requests to a private Domain Name System (DNS) name that is assigned to the activation firewall, and/or a load balancer that distributes activation requests to the activation firewall. To trigger the activation process, the license manager may send a command to the licensed application to send the activation request to the activation firewall and begin the activation process.

The activation firewall may be used to ensure that licensed applications are only activated if the licensed applications were provisioned by the license manager. In this way, the license manager may track usage of all licensed applications and determine metrics indicating the usage of the licensed applications for compliance reasons. For instance, there may be agreements in place regarding usage, such as payment or permitted use agreements, that indicate amounts of usage of licensed applications that are permitted, or costs for running licensed applications (e.g., cost per instance of a licensed application, cost for how long a licensed application is used, etc.).

To ensure that users are unable to provision and activate license instances that are not tracked by the license manager, the activation firewall may filter activation requests received from virtual computing resources. Following the above example, the activation firewall may receive the activation request sent from the application on the virtual computing resource and determine the source of the activation request. For instance, the activation firewall (and/or load balancer) may extract metadata from the activation request indicating that the virtual computing resource is a source of the activation request. The metadata may include one or more of an account identifier (ID) of the user account, a private Internet Protocol (IP) address associated with virtual computing resource, and/or a VPC ID of a VPC in which the virtual computing resource is provisioned. The activation firewall may send the metadata to the license manager and/or a compute-management platform to verify that the virtual computing resource was provisioned by the license manager.

The activation firewall may be configured to drop, block, or otherwise refrain from sending activation requests to the activation server(s) upon determining that the activation requests were received from virtual computing resources and/or applications that were not provisioned by the license manager. Conversely, the activation firewall may forward activation requests to the activation server upon determining that the activation requests were received from virtual computing resources and/or applications that were provisioned by the license manager. In this way, only applications provisioned by the license manager may be activated by activation servers.

In some instances, there may be different activation servers configured to activate different licensed applications. The activation firewall may determine a unique product code for the licensed applications. The activation firewall may store mappings between private DNS names for activation servers and unique product codes, and forward activation requests to the private DNS names that are mapped to the requests' unique product codes. In some instances, the activation firewall and activation servers may be in a service VPC of the cloud system. In other instances, however, the activation servers may be at a remote location outside of the cloud system.

The activation firewall may help establish and maintain a connection open between the virtual computing resource and the activation server to allow for activation of the application using an activation protocol. The connection may be a stateful Transport Control Protocol (TCP) connection that is used to communicate data for the activation protocol. In this way, a license manager may automate the process for provisioning and activating licensed applications for use by users of a cloud system.

In addition to provisioning and activating licensed applications, the license manager may additionally assign user accounts of the organization account to have access to applications (licensed and unlicensed applications). To provide user accounts with access to licensed applications, the organization account may onboard a directory service with the manager service. For instance, an administrator of the organization account may provide the manager service with a directory ID of the organization account, and the manager service may locate and onboard the directory service using the directory ID. The administrator may provide input indicate what user account(s) in the organization account are to be provided access to use the licensed application. The license manager may then, using the cross-account ENI and permissions, update the directory service to indicate the user account(s) that are permitted to access the application running in the organization account of the particular type. In this way, the applications running on virtual resources are usable by the assigned user accounts when the accounts present credentials (e.g., username and password, bio authenticator, etc.).

The techniques described herein solve problems rooted in cloud computing technology using solutions rooted in technology. Further, the techniques described herein improve the functioning of cloud systems. As an example, the process of activating licenses for third-party applications may be difficult or impossible depending on the protocols used and/or restrictions placed by the third-party developers. The techniques described herein enable the activation of these licensed applications such that cloud systems can support and run a greater variety of applications, thereby improving the functioning of the cloud system. Further, various cross-account management operations have traditionally been disallowed or were not previously possible. The techniques described herein enable additional cross-account management operations, which allows for cloud systems to offer managed services that can provide additional managed experiences for users.

The cross-account ENI may act as a virtual network card that runs in the user account and is accessible by a service instance running in a service account. The cross-account ENI may allow for managed service providers to deliver managed solutions where the managed service and user of the managed service are in different accounts. Generally, an "elastic" network interface is a logical networking component representing a virtual network card, which can be detached from one instance and reattached to a new instance. When reattached to the new instance, network traffic is then rerouted to the new instance while retaining certain configuration, like an IP address, a Media Access Control (MAC) address, security groups, and so forth. While some of the techniques described herein are with reference to cross-account ENIs, the techniques are equally applicable for standard cross-account network interfaces that are not detachable or movable between instances. Thus, the techniques described herein may be performed using cross-account network interfaces as well.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 that includes a cloud system 102 that has a managed service 104 in a service account that uses a cross-account ENI to reach into a user account and make configuration changes to instances.

The cloud system 102 may be operated and/or managed by a cloud or service provider and may provide various services to users to fulfil their computing resource needs, such as cloud-based computing resources. For instance, users 106 may operate user devices 108 in order to register for use of the computing resources of the cloud system 102. The cloud system 102 may include a one or more managed services 104 that include components to provide different types of automated, or semi-automated, services for users, such as managed security services, managed incident management services, managed availability services, managed resiliency services, managed compliance services, license manager services, and so forth. Generally, the managed services 104 may be, at least partly, control-plane systems that control operations occurring in the cloud system 102. The managed services 104 may be either centralized, or distributed, and be supported by one or more computing devices.

As illustrated, a cloud system 102 may be operated and/or managed by a cloud provider. The cloud system 102 may provide various services to users to fulfil their computing resource needs, such as cloud-based computing resources. For example, the cloud system 102 may provide cloud-based, scalable, and network accessible compute power services, storage services, database services, and/or other services. Users 106 may utilize user devices 108 to subscribe for use of the computing resources and/or services provided by the cloud system 102.

A cloud system 102, often referred to as a cloud provider network or simply as a "cloud," refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 102 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users 106 can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network 102 may deliver content from points of presence outside of, but networked with, these regions by way of edge locations and regional edge cache servers. This compartmentalization and geographic distribution of computing hardware enables the cloud provider network 102 to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 102 may provide on-demand, scalable computing services to users 106 through a network, for example allowing users 106 to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 106 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user 106, the hardware associated with the virtual computing devices can be scaled up or down depending upon the resources the user 106 requires. Users 106 can choose to deploy their virtual computing systems to provide network-based services for their own use and/or for use by their users or client.

The cloud provider network 102 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users 106 of the cloud provider network 102, which may be provisioned in user accounts.

The cloud system 102 may offer many different built-in services to the users 106 to help run their applications and services. For instance, the cloud system 102 may provide users 106 with use of VPCs, which are logically isolated sections of the cloud system 102 that serve as private virtual environments to which only permitted users 106 have access to use. Users 106 may have multiple VPCs, potentially spanning across different regions of the cloud system 102. To help interconnect VPCs and other resources of the user's computing infrastructure, the service provider may also offer many different built-in networking services. The VPCs may be used by the users 106 to create subnetworks, configure personalized route tables, choose IP addresses, monitor connections, screen network traffic, restrict access into the VPCs, and/or for other operations. As shown. The VPCs include or run computing resources, such as servers, virtual machines (VMs), containers, serverless functions, workloads, processes, etc. Generally, the computing resources are used to support or run applications or services of the users 106.

A virtual private cloud (VPC) (also referred to as a virtual network (VNet), virtual private network, or virtual cloud network, in various implementations) is a custom-defined, virtual network within another network, such as a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC, security groups), and transit paths.

A VPC is a virtual network dedicated to a particular customer account (or set of related customer accounts, such as different customer accounts belonging to the same business organization). A VPC is logically isolated from other virtual networks in the cloud. Customers can launch resources, such as compute instances, into a VPC. When creating a VPC, a customer can specify a range of IPv4 addresses for the VPC in the form of a Classless Inter-Domain Routing (CIDR) block. A VPC can span all of the availability zones in a particular region. After creating a VPC, a customer can add one or more subnets in each availability zone or edge location.

As illustrated, the managed services 104 may be deployed as individual instances that run on virtual resources 116 in service VPCs 114 of service accounts 110. Generally, the service VPCs 114 and service accounts 110 may be managed by the cloud provider, or by another administrator that provides the manages services 104. Further, application instances 120 may be run on behalf of users 106 on virtual resources 116 that are provisioned in user VPCs 118 in user accounts 112.

As described herein, accounts (e.g., user accounts 112, service accounts 110, etc.) are used to represent a person or application that uses their accounts to interact with their personal VPCs and the virtual resources 116 and application instances 20 running therein. The user accounts may consist of a name and credentials. The user accounts 112 may include one or more VPCs in which virtual resources 116, application instances 120, and other components are run on behalf of users 106.

As illustrated, users may opt in or enroll for managed experiences provided by different managed services 104 of the cloud system 102. The managed services 104 may provide different types of automated, or semi-automated, services for users 106. Traditionally, managed services 104 have been unable to perform certain types of management operations in user accounts 112, such as actually configuring resources or applications in user accounts 112, terminating resources or applications, and so forth. Rather, the managed services 104 have been limited to simple operations, such as read operations to obtain listings or descriptions of instances in customer accounts 112. According to the techniques described herein, users 106 may enroll for more managed and automated experiences than those traditionally provided by managed services 104. For example, users may request that managed services 104 perform additional management operations, such as launching instances 116 (or virtual resources), configuring instances 116, activating licenses of licensed applications 120, terminating instances 116, and so forth.

As shown, users 106 may interact with a console 124 to perform a managed service enrollment 126. The managed service 104 may prompt the user 106 for permission to create cross-account ENI(s) 130 and service-linked roles 132 in the user account 112. The user 106 may grant the managed service 104 these permissions, and enroll 128 for use the managed service 104. Thus, when users opt in for a more managed experience from the managed services 104, the managed services 104 may request permission from the user to install the cross-account ENI 130 and role(s) 132 in the user account 112. Generally, the cross-account ENI 130 allows the attachment or association of ENIs between VPCs in different accounts of the cloud system. The cross-account ENI 130 may act as a virtual network card that runs in the user account 112 and is accessible by a service instance 104 running in the service account 110. The cross-account ENI 130 may allow for managed service providers to deliver managed solutions where the managed service 104 and user 106 of the managed service 104 are in different accounts.

In addition to creating a cross-account ENI 130, the managed service 104 may further create the role(s) 132, which are a set of permissions that are created for the managed service 104 (also referred to herein as a "service-linked role"). The user 106 may grant the request, and the managed service 104 may create the set of permissions, or the service-linked role (SLR) 104, in the user account that the managed service 104 may assume when performing management operations in the user account 112. The roles 132 may be any type of roles or permissions, including an SLR 104. An SLR 132 may be a type of role that is linked directly to a managed service 104. SLRs 132 are predefined by the service 104 and include all the permissions that the service 104 requires to call other services 104 or perform actions on behalf of the user 106. The linked service role 132 also defines how you create, modify, and delete a service-linked role. A service 104 might automatically create or delete the role 132. It might allow users 106 to create, modify, or delete the role as part of a wizard or process in the service 132. The linked service 104 may define the permissions of its service-linked roles 132, and unless defined otherwise, only that service 104 can assume the roles 132.

Once the cross-account ENI 130 and roles 132 are created in the enrolled user account 112, the managed service 104 may begin performing various management operations. For instance, managed services 104 may access the cross-account ENI 130 and assume the permissions or role 132 to perform operations such as launching virtual instances (e.g., virtual machines (VMs), containers, etc.), provisioning applications 120 on virtual instances 116, configuring virtual instances 116 and/or applications 120, assigning user accounts to the applications (e.g., mapping user accounts to instances/applications in a service directory), activating licenses for licensed applications, terminating instances or applications, and so forth. However, additional management operations may be performed based on the managed service 104 for which the user 106 has enrolled, such security operations (e.g., blocking traffic, removing permissions from accounts, etc.), availability operations (e.g., creating fallback resources, adding availability zones, etc.), and/or other operations.

Thus, users 106 may have created user accounts with the cloud provider to utilize the resources 116 of the cloud system 102. The users 106 may utilize their devices 108 to communicate over one or more networks 122 (e.g., WANs, PANs, LANs, etc.) with the cloud system 102. The user devices 108 may comprise any type of computing device configured to communicate over network(s) 122, such as mobile phones, tablets, laptop computers, desktop computers, televisions, servers, and/or any other type of computing device. The users 106 (e.g., network administrators, organization employees, etc.) may interact with the cloud system 102, via their user account and/or one or more user portals or consoles 124 (e.g., web console, command line interface (CLI), application programming interface (API), etc.).

Generally, the managed services 104, and components thereof, may comprise software, firmware, and/or other logic that is supported one computing device, or across more computing devices in the cloud system 102. Additionally, the managed services 104 may comprise a system of other devices. The techniques described herein are generally described with respect to a service provider network, such as a cloud provider network or system. However, the techniques are generally applicable for any network, such as on-premises networks, hybrid networks, and so forth.

Figure 2:
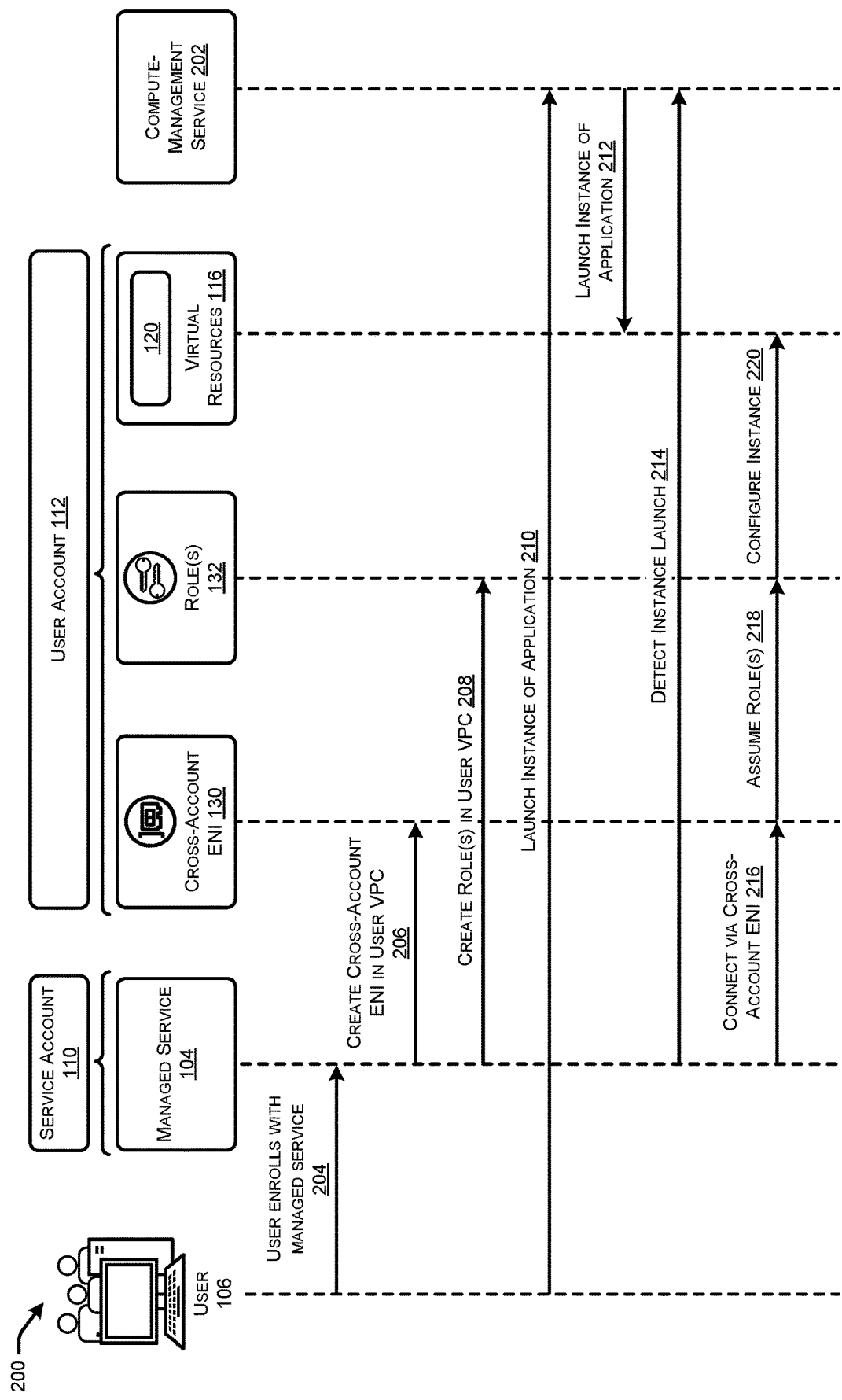
FIG. 2 illustrates a sequence diagram of an example process for a managed service to use a cross-account ENI to launch and configure an instance in a user account.

FIG. 2 illustrates a sequence diagram 200 of an example process for a managed service 104 to use a cross-account ENI 130 to launch and configure an instance in a user account 112. At 204, the user 106 may enroll with a managed service 104. As part of the enrollment, the managed service 104 may request permission to create the cross-account ENI 130 and roles 132 in the user account 112. At 206, the managed service 104 may create the cross-account ENI 130 in the user account 112, and at 208, the managed service 104 may create the roles 132 in the user account 1112 for the managed service 112 to assume.

At 210, the user 106 may launch an instance of an application 210 using a compute-management service 202. The compute-management service 202 provides scalable computing capacity in the user account 112 of the cloud system 102. Using compute-management service 202 eliminates the user's 106 need to invest in hardware up front, so the user 106 can develop and deploy applications 120 faster. Users can use compute-management service 202 to launch as many or as few virtual servers as needed, configure security and networking, and manage storage. The compute-management service 202 enables uses 106 to scale up or down to handle changes in requirements or spikes in popularity, reducing your need to forecast traffic. The compute-management service 202 launches virtual resources, known as instances, and utilizes preconfigured templates for your instances, known as Machine Images (MIs), that package the bits users 106 need for their servers (including the operating system and additional software).

At 212, the compute-management service 202 may launch an instance 116 on which an application 212 is installed. At 214, the managed service 104 may detect the instance launch 214. For instance, the compute-management service 202 may provide the managed service 104 with the current state of instances 116 that are running or have been launched for users 106.

At 216, the managed service 104 may connect to the user's account 112 using the cross-account ENI 130, and at 218 the managed service 104 may assume the role 218 in the use account 12 to perform operations. For instance, at 220, the managed service 104 may configure the instance 116, such as by configuring the instance 116 to allow certain users with access to the instance 116, or otherwise configure the instance 116 to run and be managed in the user account 112.

Figure 3:
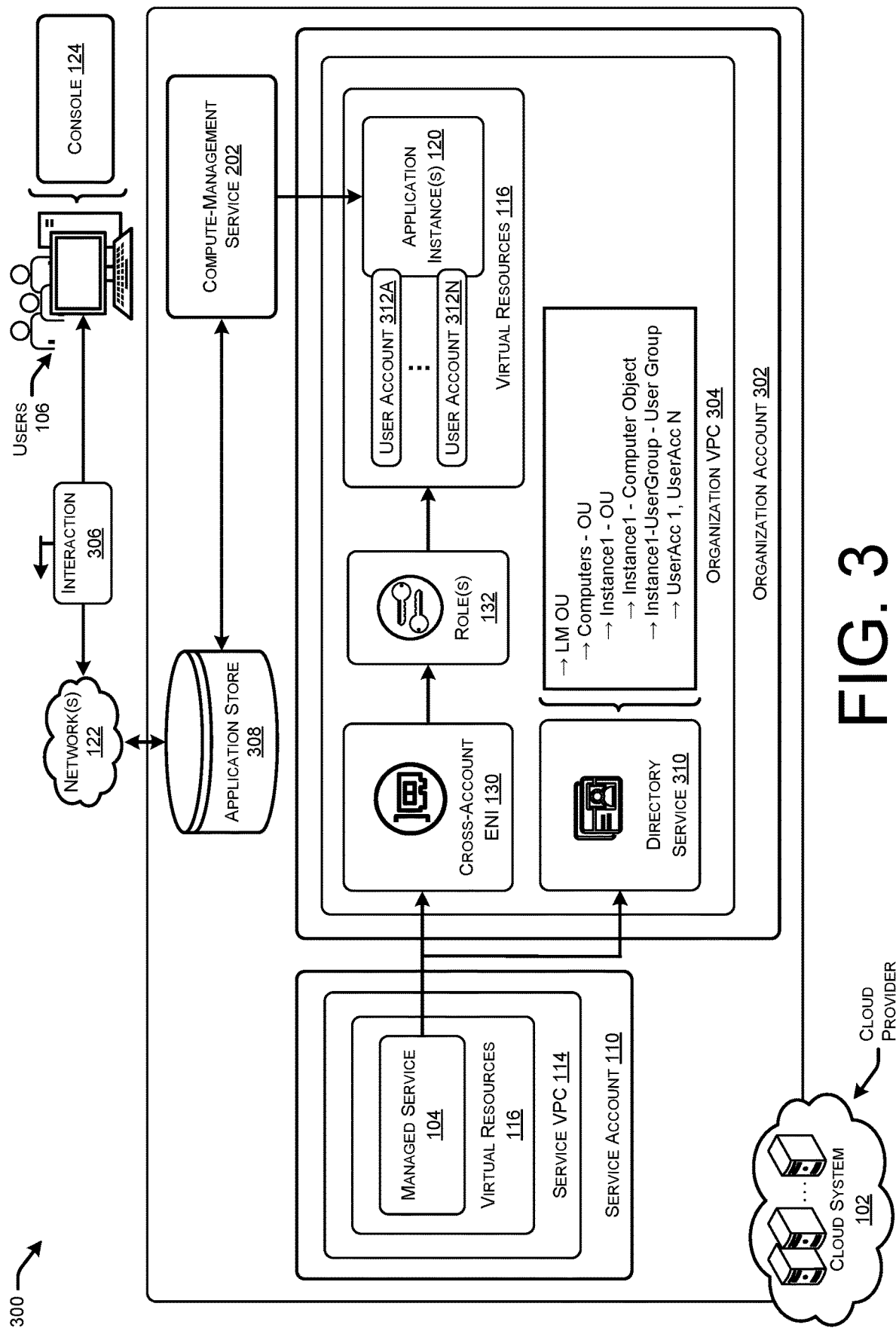
FIG. 3 illustrates a system-architecture diagram of an example environment in which a managed service in a service account uses a cross-account elastic network interface (ENI) to reach into a user account and configure a directory service in the user account to assign user accounts to application instances.

FIG. 3 illustrates a system-architecture diagram of an example environment in which a managed service 104 in a service account 110 uses a cross-account ENI 130 to reach into a user account, such as an organization account 302, and configure a directory service in the account 302 to assign user accounts to application instances.

The managed service 104, which may be a license manager 104, may additionally assign user accounts 312 of the organization account 302 to have access to application instances 120 (licensed and unlicensed applications). To provide user accounts 312 with access to applications 120, the organization account 302 may onboard a directory service 310 defined in the organization VPC 304 with the managed service 104. For instance, an administrator of the organization account 302 may provide the manager service 104 with a directory ID of the organization account 302, and the manager service 104 may locate and onboard the directory service 310 using the directory ID. The administrator may provide input indicate what user account(s) 312 in the organization account 302 are to be provided access to use the licensed application 120. The license manager 104 may then, using the cross-account ENI 130 and the role 132, update the directory service 310 to indicate the user account(s) 312 that are permitted to access the application 120 running in the organization account 302 of the particular type. In this way, the applications 120 running on virtual resources 116 are usable by the assigned user accounts 312 when the accounts present credentials (e.g., username and password, bio authenticator, etc.). As shown, the directory service 310 may include various organizational units that map different entities to each other. In this example, "instances," such as application instances 120 and/or virtual resources 116, are mapped to user accounts 312 that are allowed or authorized to access the application instances 120 or virtual resources 116.

Figure 4A:
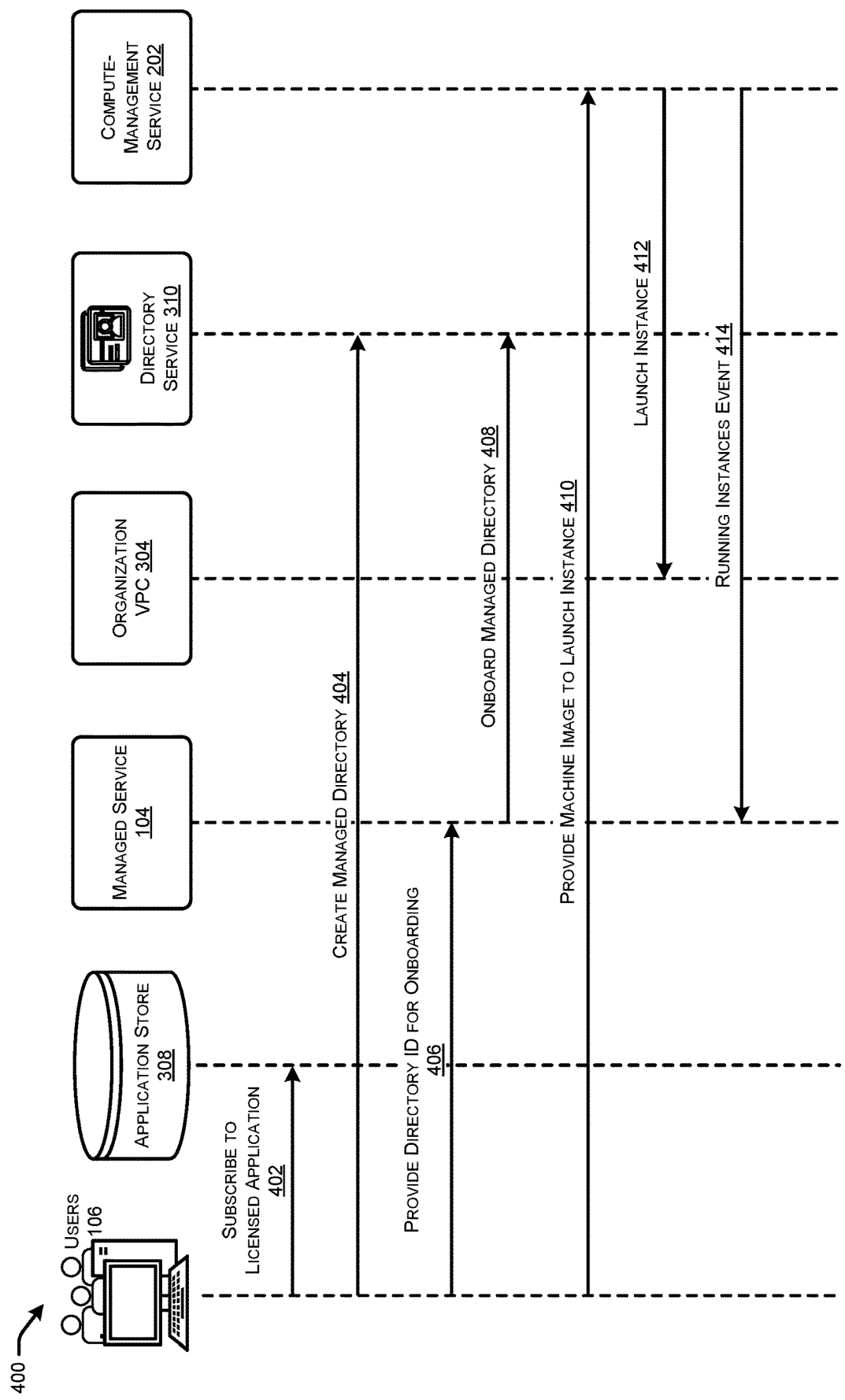

FIGS. 4A and 4B collectively illustrate a sequence diagram 400 of an example process for a managed service 104 to use a cross-account ENI 130 to launch and configure a directory service 310 in the user account to assign user accounts to application instances.

At 402, the users 106 may subscribe for use of a licensed application 402 that is managed in the application store 308. At 404, the user 106 may create a managed directory 404 with the directory service 310. At 406, the user 106 may provide a directory ID to the managed service 104 so the managed service 104 can onboard the managed directory. At 408, the managed service 104 may onboard the managed directory 408 using the directory ID and by communicating with the directory service 310. At 410, a user 106 may desire to launch one or more instances of an application 120 and provide the compute-management service 202 with a machine image to launch an instance for the application. At 412, the compute-management service 202 may launch the virtual instance 412 (e.g., VM, container, etc.) in the organization VPC 304, and at 414, the compute-management service 202 may provide a running instances event to the managed service. The running instances event may indicate instances that are running and/or have been launched by the compute-management service 202.

At 416, the managed service 104 may filter the instance launches to determine which instances were launched by the managed service 104. For instances launched by the managed service 104, the managed service 104 may perform a domain join at 418 for the instances and store data for the instance launch at 420.

At 422, the user 106, which may be an administrator, may provide usernames for the managed service 104 to authorize for the application 120. At 424, the managed service 104 may then modify the directory service 310 to add the usernames to a user group for the application 120. Then, at 426, when the added users perform a login attempt, the instances and application 120 in the organization VPC 304 indicates that the login was successful at 428 and the authorized user can access the application 120.

Figure 5:
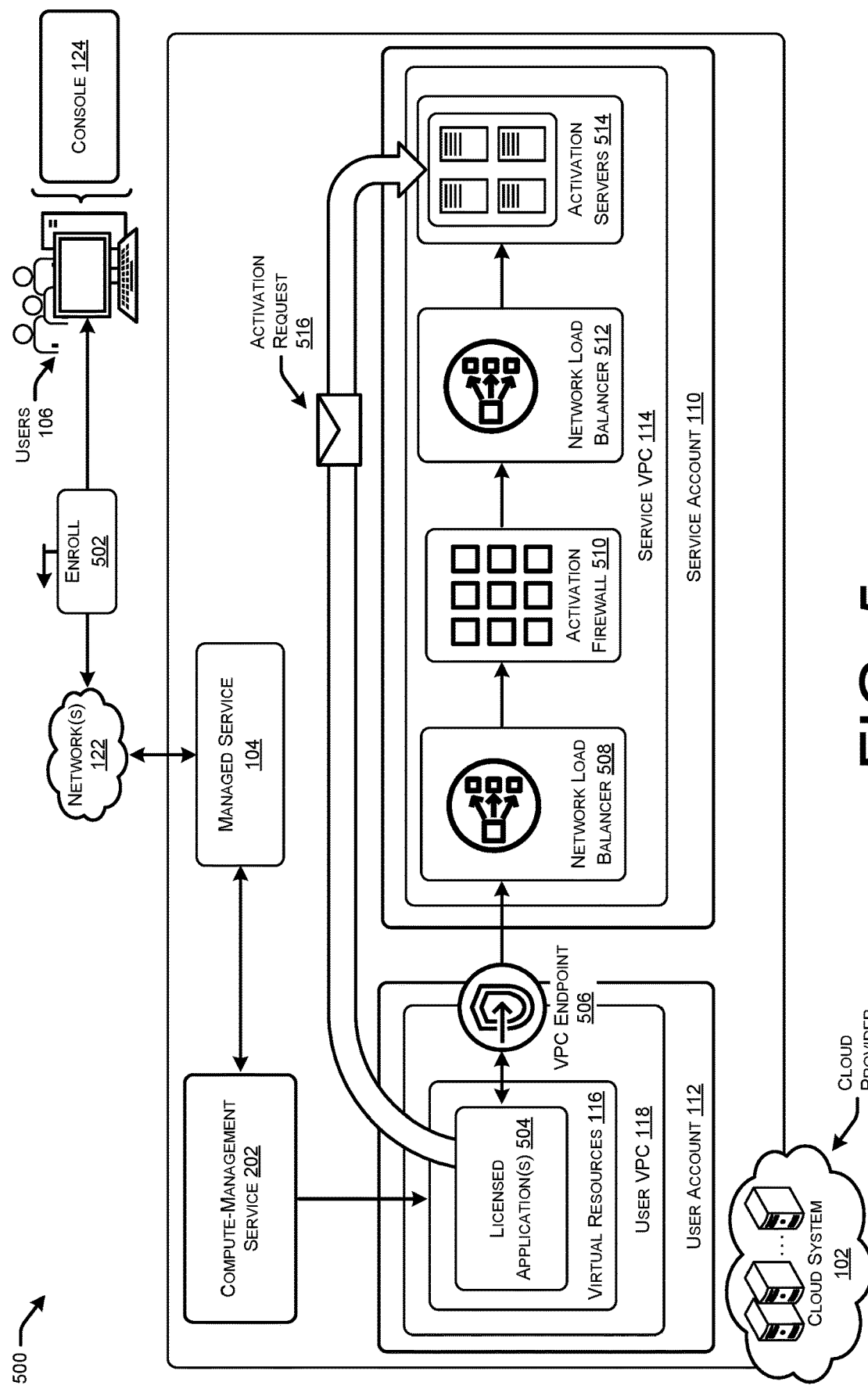
FIG. 5 illustrates a system-architecture diagram of an example environment in which a license manager activates a licensed application for use by a user account.

FIG. 5 illustrates a system-architecture diagram of an example environment 500 in which a license manager 104 activates a licensed application 504 for use by a user account.

Users 106 may desire that the license manager 104 provision licensed applications 504 and activate the licensed applications 504 with third-party providers of the software. The users 106 may request that the license manager 104 provision a new instance of a licensed application 504 on behalf of one or more user accounts. The license manager 104 may launch a virtual resource 116 (e.g., VM, container, etc.), or detect a launch of a virtual resource by the compute-management service 202, on which the licensed application 504 is installed. The license manager 104 may configure the licensed application 504 to send activation requests 516 to an activation firewall 510 that is configured to allow or deny activations requests 516. For instance, the licensed application 504 may be configured to send activation requests 516 to a private DNS name that is assigned to the activation firewall 510, and/or a network load balancer 508 that distributes activation requests 516 to the activation firewall 510. To trigger the activation process, the license manager 104 may send a command to the licensed application 504 to send the activation request 516 to the activation firewall 510 and begin the activation process.

The activation firewall 510 may be used to ensure that licensed applications 504 are only activated if the licensed applications 504 were provisioned by the license manager 104. In this way, the license manager 104 may track usage of all licensed applications 504 and determine metrics indicating the usage of the licensed applications 504 for compliance reasons. For instance, there may be agreements in place regarding usage, such as payment or permitted use agreements, that indicate amounts of usage of licensed applications that are permitted, or costs for running licensed applications (e.g., cost per instance of a licensed application, cost for how long a licensed application is used, etc.).

To ensure that users 106 are unable to provision and activate license instances that are not tracked by the license manager 104, the activation firewall 510 may filter activation requests 516 received from virtual computing resources 116. Following the above example, the activation firewall 510 may receive the activation request 516 sent from the application 504 on the virtual computing resource 116 and determine the source of the activation request 516. For instance, the activation firewall 510 (and/or load balancer) may extract metadata from the activation request 516 indicating that the virtual computing resource 116 is a source of the activation request 516. The metadata may include one or more of an account ID of the user account 112, a private IP address associated with virtual computing resource 116, and/or a VPC ID of the VPC 118 in which the virtual computing resource 116 is provisioned. The activation firewall 510 may send the metadata to the license manager 104 and/or a compute-management service 202 to verify that the virtual computing resource 116 was provisioned by the license manager 104.

The activation firewall 510 may be configured to drop, block, or otherwise refrain from sending activation requests 516 to the activation server(s) 514 upon determining that the activation requests 516 were received from virtual computing resources 116 and/or applications 504 that were not provisioned by the license manager 104. Conversely, the activation firewall 510 may forward activation requests 516 to the activation server 514 upon determining that the activation requests 516 were received from virtual computing resources 116 and/or applications 504 that were provisioned by the license manager 104. In this way, only applications 504 provisioned by the license manager 104 may be activated by activation servers 514.

In some instances, there may be different activation servers 514 configured to activate different licensed applications 504. The activation firewall 510 may determine a unique product code for the licensed applications 504. The activation firewall 510 may store mappings between private DNS names for activation servers 514 and unique product codes, and forward activation requests to the private DNS names that are mapped to the requests' unique product codes. In some instances, the activation firewall 510 and activation servers 514 may be in a service VPC 114 of the cloud system 102. In other instances, however, the activation servers 514 may be at a remote location outside of the cloud system 102.

The activation firewall 510 may help establish and maintain a connection open between the virtual computing resource 116 and the activation server 514 to allow for activation of the application 504 using an activation protocol. The connection may be a stateful TCP connection that is used to communicate data for the activation protocol. In this way, a license manager 104 may automate the process for provisioning and activating licensed applications 504 for use by users of a cloud system 102.

Figure 6:
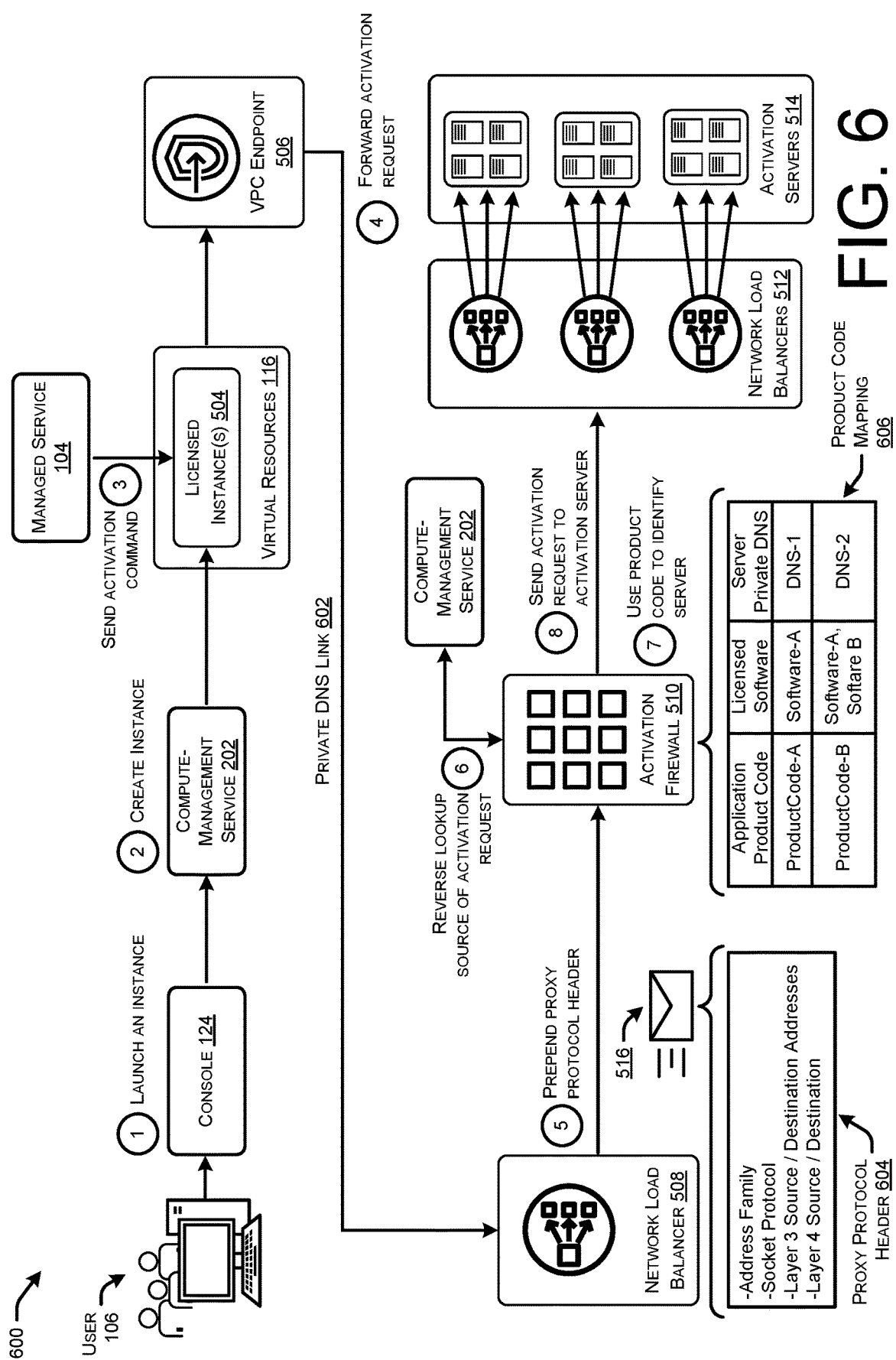
FIG. 6 illustrates a flow diagram in which a license manager and components of a cloud system activates a licensed application for use by a user account.

FIG. 6 illustrates a flow diagram 600 in which a license manager and components of a cloud system activates a licensed application for use by a user account.

At 1, the user 106 may access their console 124 and launch an instance. The request to launch an instance may be sent to the compute-management service 202, and at 2, the compute-management service 202 may create the instance. At 3, the managed service 104 may send an activation command that causes or triggers the licensed instance to send an activation request 516. At 4, a VPC endpoint 506 may forward the activation request 516 over a private DNS link 602 that is connected to a network load balancer 508 associated with the activation firewall 510. At 5, the network load balancer 508 may prepend a proxy protocol header 504 to the activation request 516 that includes information that the activation server 514 would have been able to get by itself if the client was connecting directly to the server 514 rather than via a proxy. The information carried by the protocol may be the ones the activation server 514 would get using getsockname( ) and getpeername( ) such as the address family (AF_INET for IPv4, AF_INET6 for IPv6, AF_UNIX), the socket protocol (SOCK_STREAM for TCP, SOCK_DGRAM for UDP), layer 3 source and destination addresses, and/or layer 4 source and destination ports if any.

At 6, the network load balancer 508 may sent the activation request 516 to the activation firewall 510, and the activation firewall 510 may perform a reverse lookup at 6 for the source of the activation request 516. Generally, the activation firewall 510 may scan all proxy protocol headers 604 sent over the Network Load Balancer 508 in order to reverse-lookup the request's origination data. The data in the header 604 may include account ID, IP address, and VPC ID for the source of the activation request 516. The activation firewall 510 may call a describe-instances API to fetch a product code associated with the originating instance 116 to verify that it was provisioned by a managed service 104. Once the activation firewall 510 validates request's 516 origin as being authorized (e.g., from an instance managed by a managed service 104, such as license manager), the activation firewall 510 may identify a server 514 to which the activation request 516 is to be forwarded. The activation firewall may, at 7, use a product code mapping 606 to identify an activation server 514 for the activation request 516. The product code may be mapped to a private DNS of an activation server 514, and the activation firewall 510 may, at 8, send the activation request 516 to the identified activation server 514.

Figure 7:
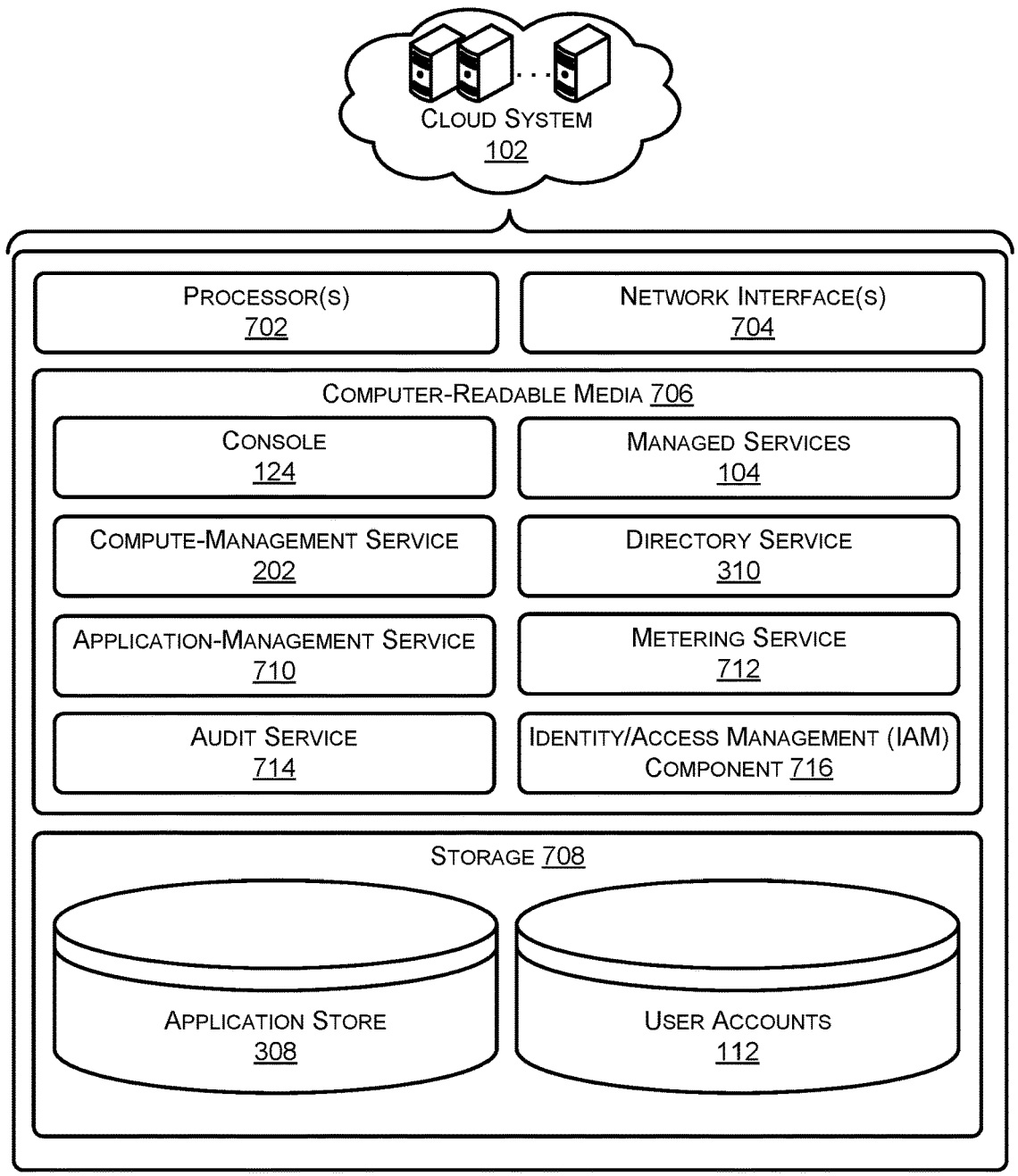
FIG. 7 illustrates a component diagram of example components of a cloud system that performs the techniques described herein.

FIG. 7 illustrates a component diagram 200 of example components of a cloud system 102 that performs the techniques described herein. As illustrated, the cloud system 102 may include one or more hardware processors 702 (processors), one or more devices, configured to execute one or more stored instructions. The processor(s) 702 may comprise one or more cores. Further, the cloud system 102 may include one or more network interfaces 704 configured to provide communications between the cloud system 102 and other devices, such as the user device(s), and/or other systems or devices in the cloud system 102 and/or remote from the cloud system 102. The network interfaces 704 may include devices configured to couple to personal area networks (PANs), wired and wireless local area networks (LANs), wired and wireless wide area networks (WANs), and so forth.

The cloud system 102 may also include computer-readable media 706 that stores various executable components (e.g., software-based components, firmware-based components, etc.). In addition to various components discussed in the previous FIGs., the computer-readable-media 706 may further store components to implement functionality described herein. While not illustrated, the computer-readable media 706 may store one or more operating systems utilized to control the operation of the one or more devices that comprise the cloud system 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the cloud system 102 may include a data store, or storage 708, which may comprise one, or multiple, repositories or other storage locations for persistently storing and managing collections of data such as databases, simple files, binary, and/or any other data. The storage 708 may include one or more storage locations that may be managed by one or more database management systems.

The computer-readable media 206 may store services, or components, of the cloud system 102 as described herein. Further, the computer-readable media 206 may store an application-management service 720 configured to manage the applications are offered for use in the cloud system 102 (e.g., in the application store 308). Further, the computer-readable media 206 may store and execute a metering service 712 to track the number of instances of an application running for compliance and cost reasons. Additionally, the computer-readable media 206 may store and execute an audit service 714 that audits usage of applications 120 to ensure that users 106 are compliant with rules for using the applications 120 (e.g., identifying untracked application instances and onboarding them).

To utilize the services provided by the cloud system 102, the users 106 may register for accounts 112 with the cloud system 102. For instance, users 106 may utilize a user device to interact with an identity and access management (IAM) component 716 that allows the users 106 to create user accounts 112 with the cloud system 102. Generally, the IAM component 716 may enable the users 106 to manage their network infrastructures remotely, and view analytics provided by the NAA system 104. Generally, the different user accounts 112 can assume different roles, or sets or permissions/credentials, that allow network users 106 to perform different actions, and be restricted from performing some actions. In some instances, a same organization may have multiple accounts that have different network infrastructures.

The computer-readable media 706 may be used to store and retrieve information, such as program modules, data structures, or other data. It should be appreciated by those skilled in the art that computer-readable storage media is any available media that provides for the non-transitory storage of data and that can be accessed by the cloud system 102. In some examples, the operations performed by the cloud system 102, and or any components included therein, may be supported by one or more server devices. Stated otherwise, some or all of the operations performed by the cloud system 102, and or any components included therein, may be performed by one or more computer devices operating in a cloud-based arrangement.

By way of example, and not limitation, computer-readable storage media 706 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

FIGS. 8-12 illustrate flow diagrams of example methods 800, 900, 1000, 1100, and 1200 that illustrate aspects of the functions performed at least partly by the cloud system 102 as described in this disclosure. The logical operations described herein with respect to FIGS. 8-12 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 8-12 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 8:
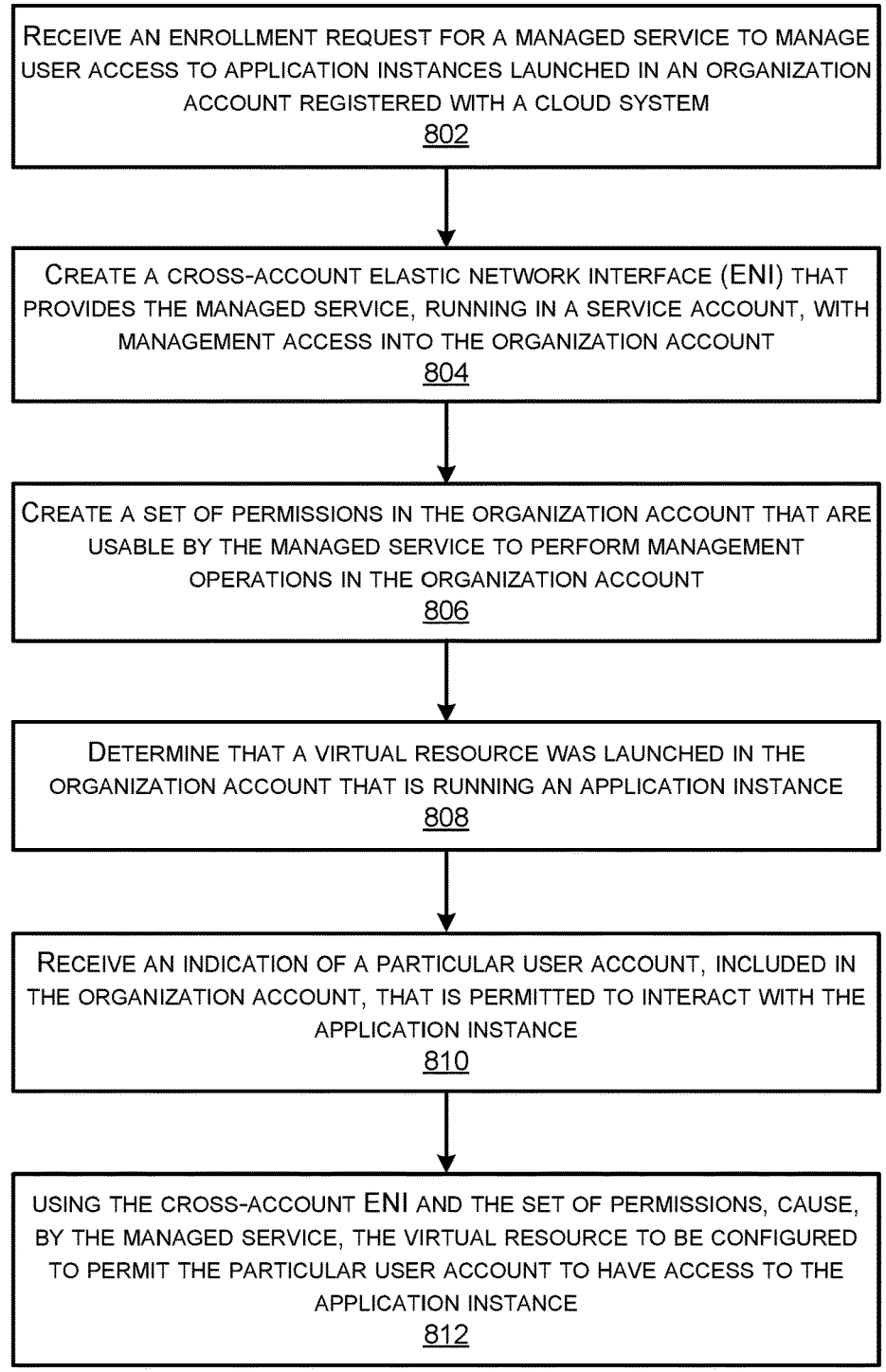
FIG. 8 illustrates a flow diagram of an example process for a managed service to use a cross-account ENI to configure a virtual resource to permit a user account to access an application running thereon.

FIG. 8 illustrates a flow diagram of an example process 800 for a managed service to use a cross-account ENI to configure a virtual resource to permit a user account to access an application running thereon.

At 802, a managed service 104 may receive an enrollment request for the managed service to manage user access to application instances launched in an organization account registered with a cloud system. For instance, a user 106 may enroll via a console 124 for the managed service 104 to manage which user accounts get access to application instances 120.

At 804, the managed service 104 may create a cross-account elastic network interface (ENI) that provides the managed service, running in a service account, with management access into the organization account 304. The managed service 104 may get permission from the user/admin in the enrollment stage to create the cross-account ENI 130, and may then create the cross-account ENI 130 in the user account 112.

At 806, the managed service 104 may create a set of permissions in the organization account that are usable by the managed service to perform management operations in the organization account 304. The managed service 104 may get permission from the user/admin in the enrollment stage to create the roles 132 or permissions, and may then create the roles 132 or permissions in the user account 112.

At 808, the managed service 104 may determine that a virtual resource was launched in the organization account that is running an application instance 120. For instance, the managed service 104 may receive an event 414 from the compute-management service 202 indicating running instances, and filter to identify instances that are managed by the managed service 104.

At 810, the managed service 104 may receive an indication of a particular user account, included in the organization account, that is permitted to interact with the application instance 120. For example, the admin of the organization account 302 may indicate which user account(s) 312 are permitted to interact with the application instance 120 and get authorized access.

At 812, using the cross-account ENI and the set of permissions, the managed service 104 may cause the virtual resource to be configured to permit the particular user account to have access to the application instance 120. For instance, the managed service 104 may interact with a directory service 310 of the organization account 302 that has been onboarded in order to assign the user accounts 312 access to the application instance 120.

Figure 9:
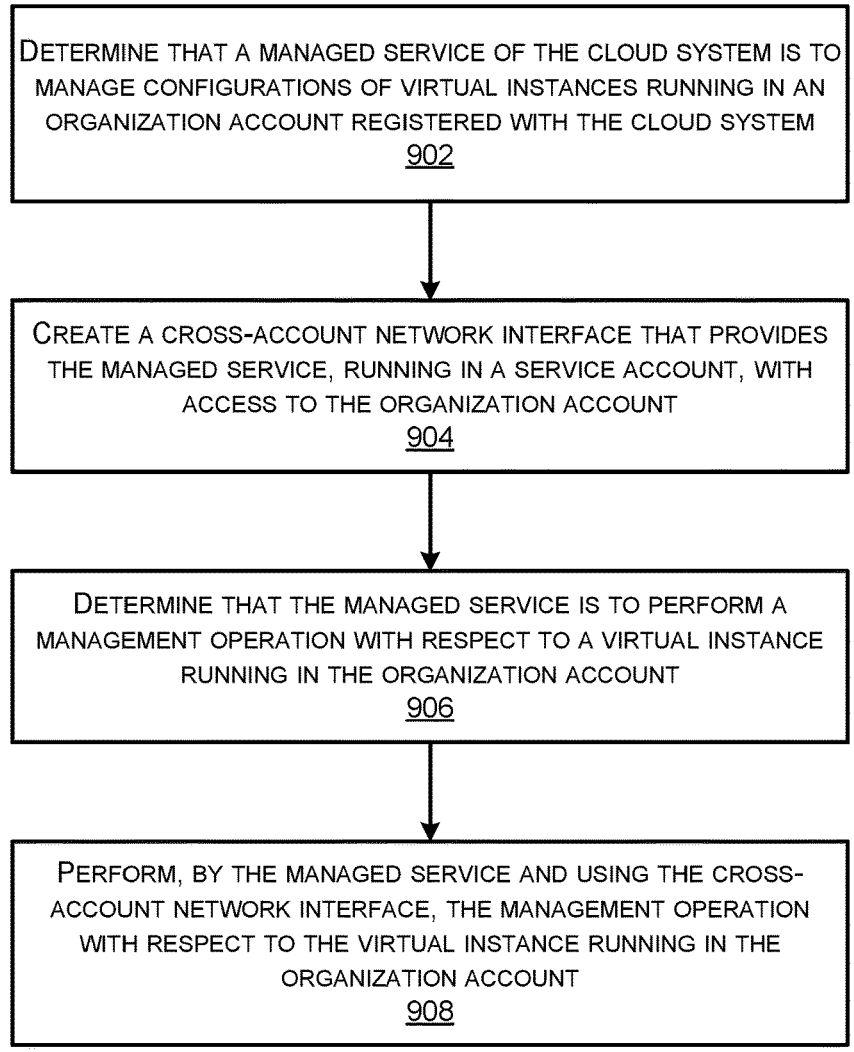
FIG. 9 illustrates a flow diagram of an example process for a managed service to use a cross-account network interface to perform a management operation on a virtual instance running in an organization account of a cloud system.

FIG. 9 illustrates a flow diagram of an example process 900 for a managed service to use a cross-account network interface to perform a management operation on a virtual instance running in an organization account of a cloud system 102.

At 902, a managed service 104 may of a cloud system may determine to manage configurations of virtual instances running in an organization account registered with the cloud system. For instance, a user may enroll for use of the managed service 104 and the managed service 104 may begin managing configurations of virtual instances (e.g., VMs, containers, applications, and/or other virtual processes).

At 904, the managed service 104 may create a cross-account network interface that provides the managed service, running in a service account, with access to the organization account. The managed service 104 may get permission from the user/admin in the enrollment stage to create the cross-account network interface 130, and may then create the cross-account network interface 130 in the user account 112.

At 906, the managed service 104 may determine to perform a management operation with respect to a virtual instance running in the organization account. The management operation may be one or more of launching instances, configuring instances, activating licenses of licensed applications, terminating instances, and so forth. At 908, the managed service 104 may perform, using the cross-account network interface, the management operation with respect to the virtual instance running in the organization account.

Figure 10:
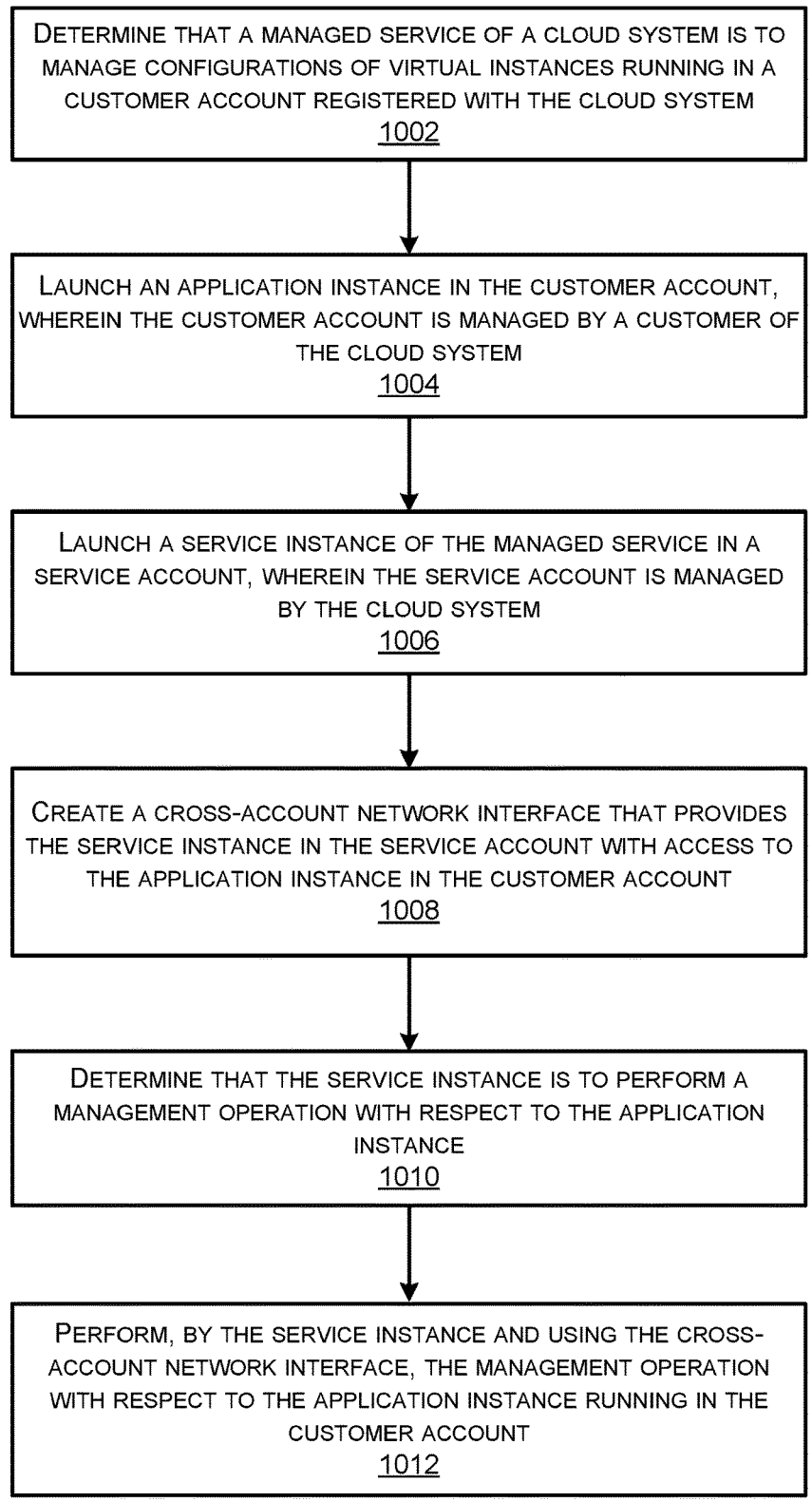
FIG. 10 illustrates a flow diagram of an example process for a managed service to use a cross-account network interface to perform a management operation on a virtual instance running in an organization account of a cloud system.

FIG. 10 illustrates a flow diagram of an example process 1000 for a managed service to use a cross-account network interface to perform a management operation on a virtual instance running in an organization account of a cloud system.

At 1002, a managed service of a cloud system may determine that it is to manage configurations of virtual instances running in a customer account registered with the cloud system. For instance, a user may enroll for use of the managed service 104 and the managed service 104 may begin managing configurations of virtual instances (e.g., VMs, containers, applications, and/or other virtual processes).

At 1004, the managed service 104 may launch an application instance in the customer account, wherein the customer account is managed by a customer of the cloud system. At 1006, the managed service 104 may launch a service instance of the managed service in a service account, wherein the service account is managed by the cloud system. The service instance may be designated to manage the account of the particular customer.

At 1008, the managed service 104 may create a cross-account network interface that provides the service instance in the service account with access to the application instance in the customer account. The managed service 104 may get permission from the user/admin in the enrollment stage to create the cross-account network interface 130, and may then create the cross-account network interface 130 in the user account 112.

At 1010, the managed service 104 may determine that the service instance is to perform a management operation with respect to the application instance 120. For instance, the managed service 104 may determine to configure a new application instance 120 was launched and needs to be configured, and/or a new user account 312 is to be given access to the application instance 120.

At 1012, the managed service 104 may perform, by the service instance and using the cross-account network interface, the management operation with respect to the application instance running in the customer account. For instance, the service instance 102 running in the service account 110 may use the cross-account network interface 130 to reach into the user account 112 and perform a management operation with respect to the application instance 120, such as configuring the application instance 120, assigning a user account 312 to be authorized to use the new instance 120 (e.g., interacting with a directory service 310 to map the user account 312 to the application instance 120), activating a license for the application instance 120, and so forth.

Figure 11:
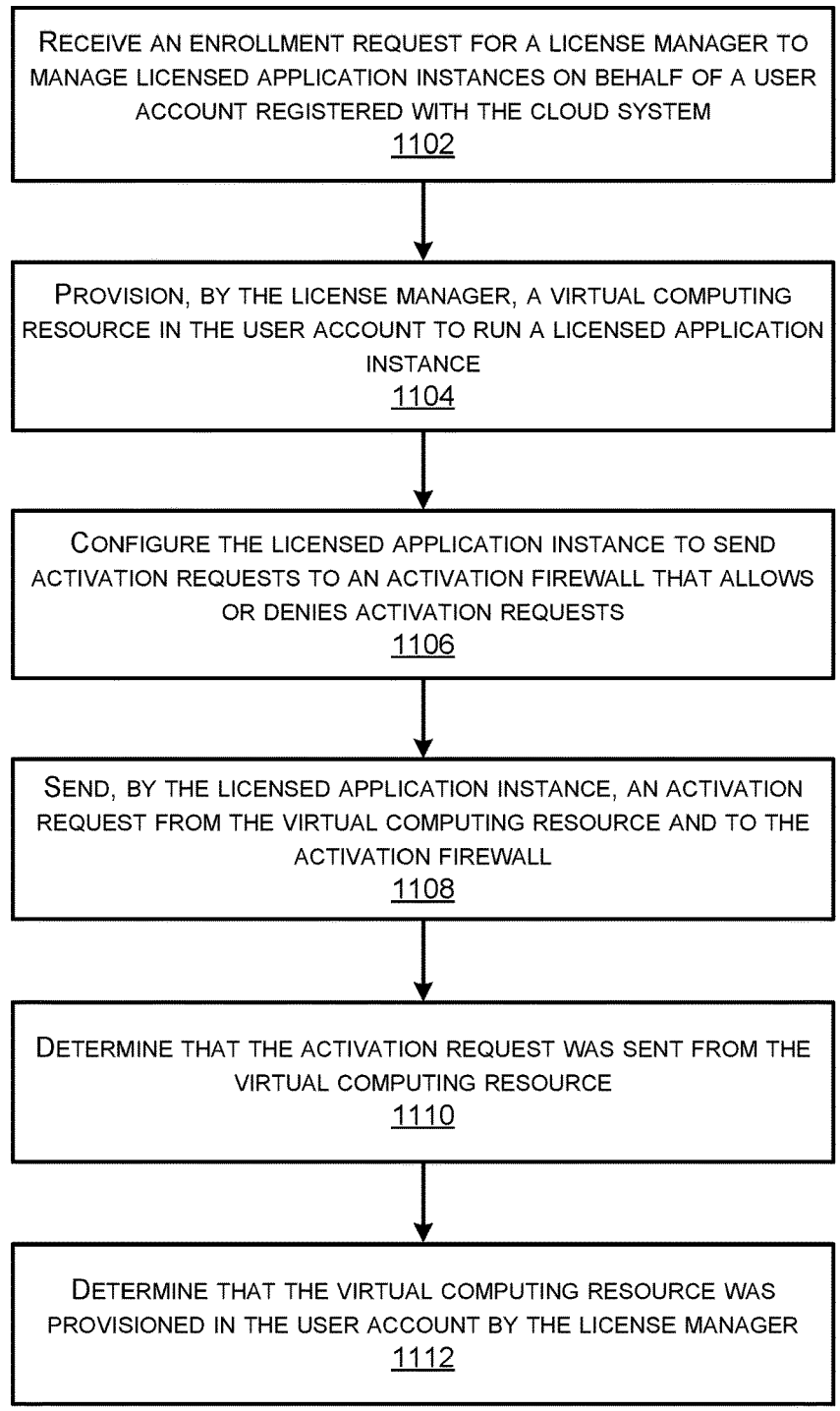
FIG. 11 illustrate a flow diagram of an example process for components of a cloud system to activate a licensed application running in the cloud system on behalf of a user account.

FIG. 11 illustrate a flow diagram of an example process 1100 for components of a cloud system to activate a licensed application running in the cloud system on behalf of a user account.

At 1102, a license manager 104 may receive an enrollment request to manage licensed application instances on behalf of a user account registered with the cloud system. As an example, license manager 104 may receive an enrollment 502 from a user 106 to have the license manager 504 manage licensed applications 504 on behalf of the user 106.

At 1104, the license manager 104 may provision a virtual computing resource in the user account to run a licensed application instance 120. For instance, the license manager 104 may receive a request to launch a virtual resource 116 to run a licensed application 504 in the user account 112.

At 1106, the license manager 104 may configure the licensed application instance to send activation requests to an activation firewall that allows or denies activation requests. For instance, the license manager 504 may configure the licensed applications 504 to send activation requests 516 to a VPC endpoint 506 that may forward the activation requests 516 over the private DNS link 602 that is connected to a network load balancer 508 associated with the activation firewall 510.

At 1108, the licensed application instance may send an activation request from the virtual computing resource and to the activation firewall. The licensed application instance 504 may use the exposed VPC endpoint 506 to send the activation request over the private DNS link 602 that is connected to a network load balancer 508 associated with the activation firewall 510.

At 1110, the activation firewall (and/or network load balancer) may determine that the activation request was sent from the virtual computing resource. For instance, the activation firewall 510 may perform a reverse lookup for the source of the activation request 516. Generally, the activation firewall 510 may scan all proxy protocol headers 604 sent over the Network Load Balancer 508 in order to reverse-lookup the request's 516 origination/source data. The data in the header 604 may include account ID, IP address, and VPC ID for the source of the activation request 516.

At 1112, the activation firewall 510 may determine that the virtual computing resource 116 was provisioned in the user account by the license manager 104. For instance, the activation firewall 510 may call a describe-instances API to fetch a product code associated with the originating instance 116 to verify that it was provisioned by a licensed manager 104. Once the activation firewall 510 validates request's 516 origin as being authorized (e.g., from an instance managed by a managed service 104, such as license manager), the activation firewall 510 may identify a server 514 to which the activation request 516 is to be forwarded.

At 1114, the license manager 104 may, in response to determining that the virtual computing resource was provisioned by the license manager, forward the activation request from the activation firewall and to an activation server that activates licensed applications for use. For instance, the activation firewall may use a product code mapping 606 to identify an activation server 514 for the activation request 516. The product code may be mapped to a private DNS of an activation server 514, and the activation firewall 510 may send the activation request 516 to the identified activation server 514.

Figure 12:
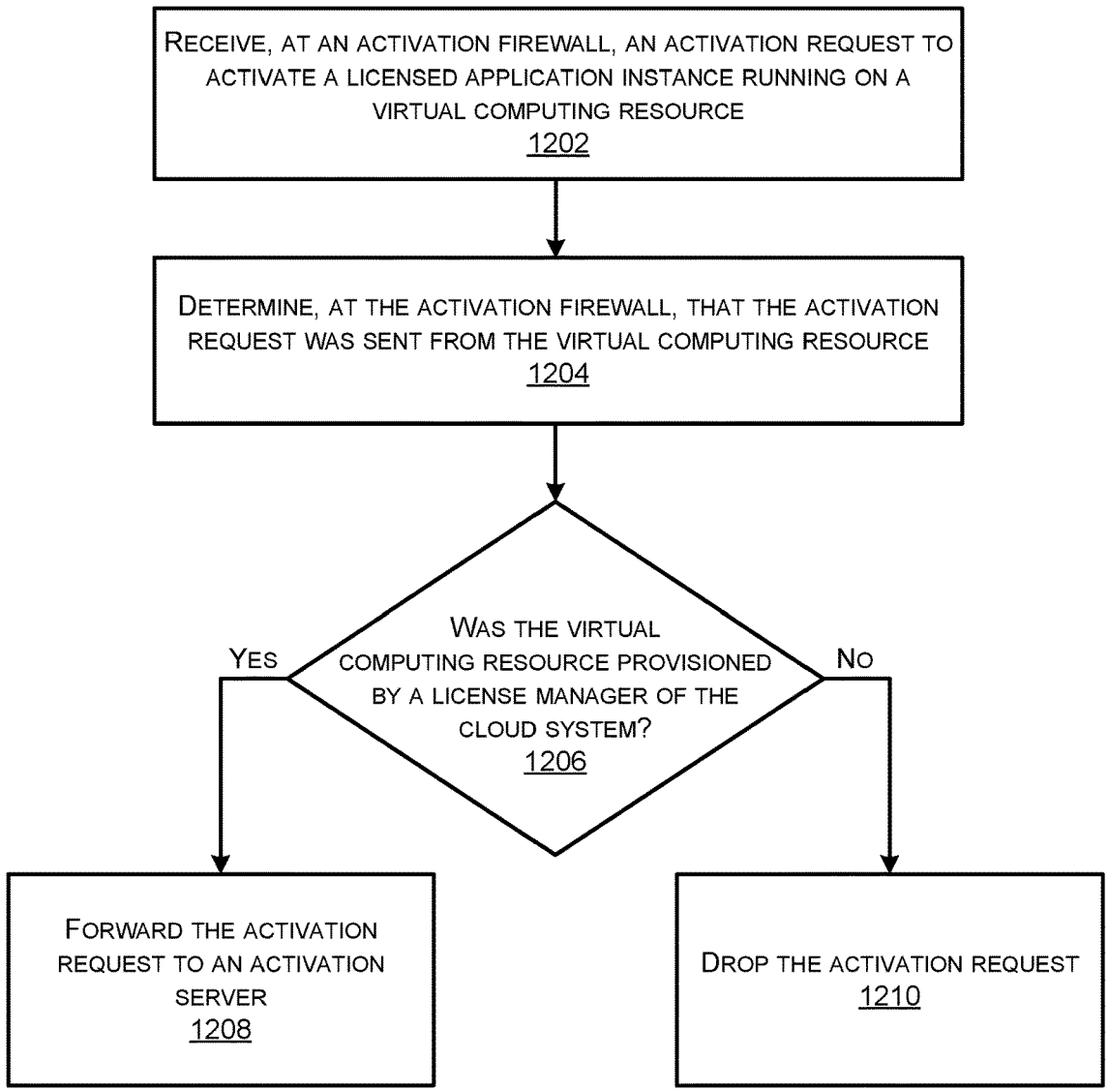
FIG. 12 illustrate a flow diagram of an example process for an activation firewall to filter activation requests from licensed applications.

FIG. 12 illustrate a flow diagram of an example process 1200 for an activation firewall 510 to filter activation requests 516 from licensed applications 504.

At 1202, the activation firewall 510 may receive an activation request 516 to activate a licensed application instance 504 running on a virtual computing resource 116 where the virtual computing resource 116 is running in a user account 112 registered with the cloud system 102.

At 1204, the activation firewall 510 may determine that the activation request was sent from the virtual computing resource. For instance, the activation firewall 510 may perform a reverse lookup for the source of the activation request 516. Generally, the activation firewall 510 may scan all proxy protocol headers 604 sent over the Network Load Balancer 508 in order to reverse-lookup the request's 516 origination/source data. The data in the header 604 may include account ID, IP address, and VPC ID for the source of the activation request 516.

At 1206, the activation firewall 510 may determine whether the virtual computing resource was provisioned by a license manager of the cloud system. For instance, the activation firewall 510 may perform a reverse lookup for the source of the activation request 516. Generally, the activation firewall 510 may scan all proxy protocol headers 604 sent over the Network Load Balancer 508 in order to reverse-lookup the request's 516 origination/source data. The data in the header 604 may include account ID, IP address, and VPC ID for the source of the activation request 516.

At 1208, the activation firewall 510 may, in response to determining that the virtual computing resource was provisioned by the license manager, forward the activation request to an activation server. For instance, the activation firewall may use a product code mapping 606 to identify an activation server 514 for the activation request 516. The product code may be mapped to a private DNS of an activation server 514, and the activation firewall 510 may send the activation request 516 to the identified activation server 514.

As illustrated, there may be groupings of activation servers 514 that are provided activation requests 516 from respective network load balancer(s) 512. The groupings of activation servers 514 may be configured to license different types of software, products, applications, etc. Similarly, the assigned network load balancers 512 may distribute activation requests 516 for a same type of application 120 to the groupings of activation servers 514 such that the network load balancers 512 do not need to be aware of the activation request 516. The activation firewall 510 may send activation requests 516 to the network load balancers 512 that distribute the activation requests 516 to activation server 514 groupings that handle licensing of the particular type of application that sent the activation request 516.

At 1210, the activation firewall 510 may, in response to determining that the virtual computing resource was not provisioned by the license manager, drop the activation request. For instance, if the reverse lookup for the source of the activation request 516 indicates that the virtual computing resource 116 was not provisioned by the license manager 104, but rather by a different service, the activation firewall 510 may drop the activation request 516.

Figure 13:
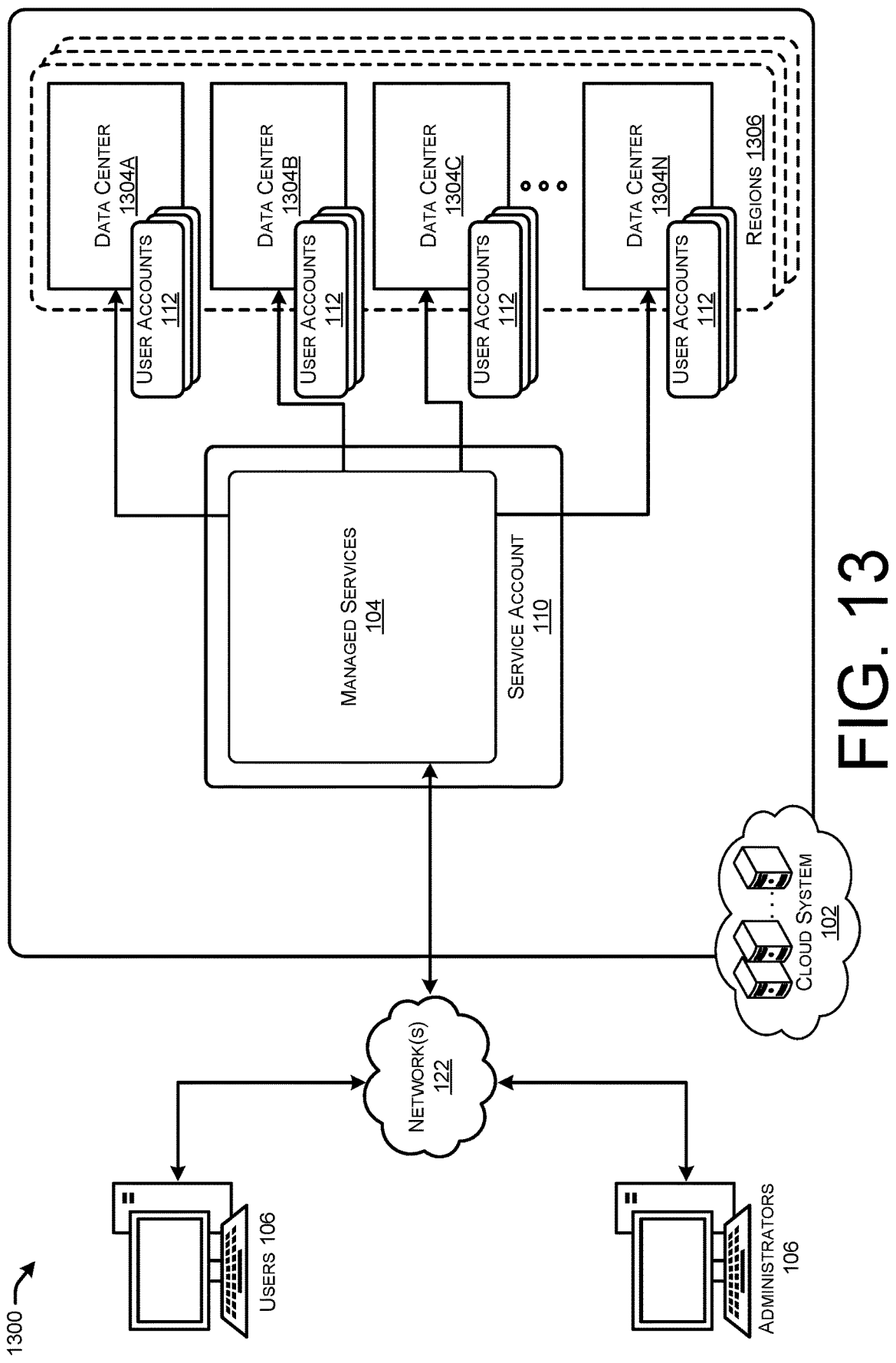
FIG. 13 is a system and network diagram that shows an illustrative operating environment that includes data centers of a cloud system that can be configured to implement aspects of the functionality described herein.

FIG. 13 is a system and network diagram 1300 that shows an illustrative operating environment that includes data centers 1304 in one or more regions 1306 of a cloud system 102 that can be configured to implement aspects of the functionality described herein. The cloud system 102 can provide computing resources, like VM instances and storage, on a permanent or an as-needed basis. Among other types of functionality, the computing resources provided by the cloud system 102 may be utilized to implement the various services described above. As also discussed above, the computing resources provided by the cloud system 102 can include various types of computing resources, such as data processing resources like VM instances, data storage resources, networking resources, data communication resources, network services, and the like.

Each type of computing resource provided by the cloud system 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The cloud system 102 can also be configured to provide other types of computing resources not mentioned specifically herein.

The computing resources provided by the cloud system 102 may be enabled in one embodiment by one or more data centers 1304A-1304N (which might be referred to herein singularly as "a data center 1304" or in the plural as "the data centers 1304"). The data centers 1304 are facilities utilized to house and operate computer systems and associated components. The data centers 1304 typically include redundant and backup power, communications, cooling, and security systems. The data centers 1304 can also be located in geographically disparate locations, or regions 1306. One illustrative embodiment for a data center 1304 that can be utilized to implement the technologies disclosed herein will be described below with regard to FIG. 14.

The users 106, such as administrators 106, of the user devices 108 that utilize the cloud system 102 may access the computing resources provided by the cloud system 102 over any wired and/or wireless network(s) 122, which can be a wide area communication network ("WAN"), such as the Internet, an intranet or an Internet service provider ("ISP") network or a combination of such networks. For example, and without limitation, a user device operated by a user 106 of the cloud system 102 may be utilized to access the cloud system 102 by way of the network(s) 122. It should be appreciated that a local-area network ("LAN"), the Internet, or any other networking topology known in the art that connects the data centers 1304 to remote clients and other users can be utilized. It should also be appreciated that combinations of such networks can also be utilized.

Figure 14:
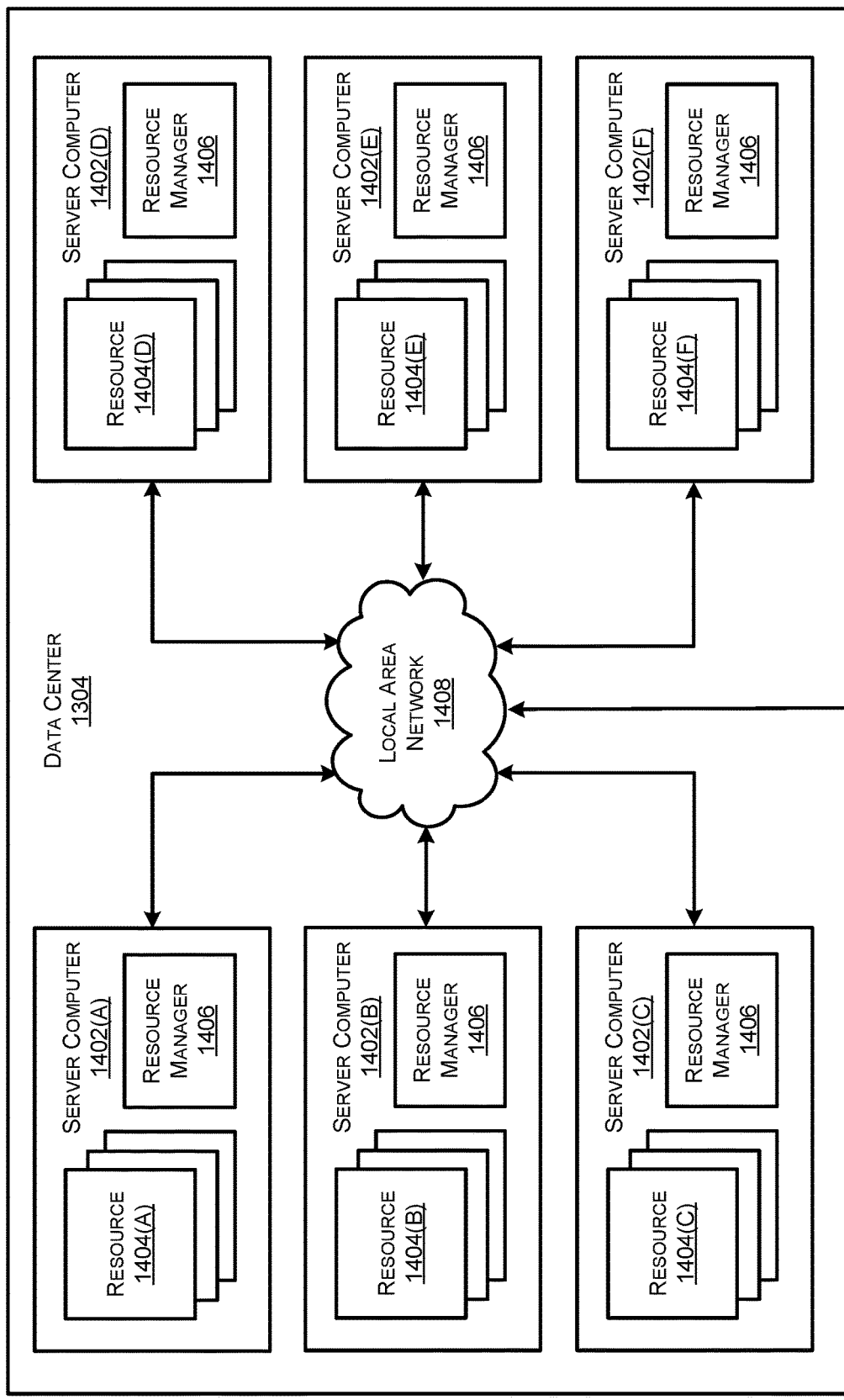
FIG. 14 is a computing system diagram illustrating a configuration for a data center that can be utilized to implement aspects of the technologies disclosed herein.

FIG. 14 is a computing system diagram 1400 that illustrates one configuration for a data center 1304 that implements aspects of the technologies disclosed herein. The example data center 1304 shown in FIG. 14 includes several server computers 1402A-1402F (which might be referred to herein singularly as "a server computer 1402" or in the plural as "the server computers 1402") for providing computing resources 1404A-1404E. In some examples, the resources 1404 and/or server computers 1402 may include, be included in, or correspond to, the computing devices described herein.

The server computers 1402 can be standard tower, rackmount, or blade server computers configured appropriately for providing the computing resources described herein (illustrated in FIG. 14 as the computing resources 1404A-1404E). As mentioned above, the computing resources provided by the cloud system 102 can be data processing resources such as VM instances or hardware computing systems, database clusters, computing clusters, storage clusters, data storage resources, database resources, networking resources, and others. Some of the servers 1402 can also be configured to execute a resource manager 1406 capable of instantiating and/or managing the computing resources. In the case of VM instances, for example, the resource manager 1406 can be a hypervisor or another type of program configured to enable the execution of multiple VM instances on a single server computer 1402. Server computers 1402 in the data center 1304 can also be configured to provide network services and other types of services.

In the example data center 1304 shown in FIG. 14, an appropriate LAN 1408 is also utilized to interconnect the server computers 1402A-1402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1404A-1404N, between each of the server computers 1402A-1402F in each data center 1304, and, potentially, between computing resources in each of the server computers 1402. It should be appreciated that the configuration of the data center 1304 described with reference to FIG. 14 is merely illustrative and that other implementations can be utilized.

Figure 15:
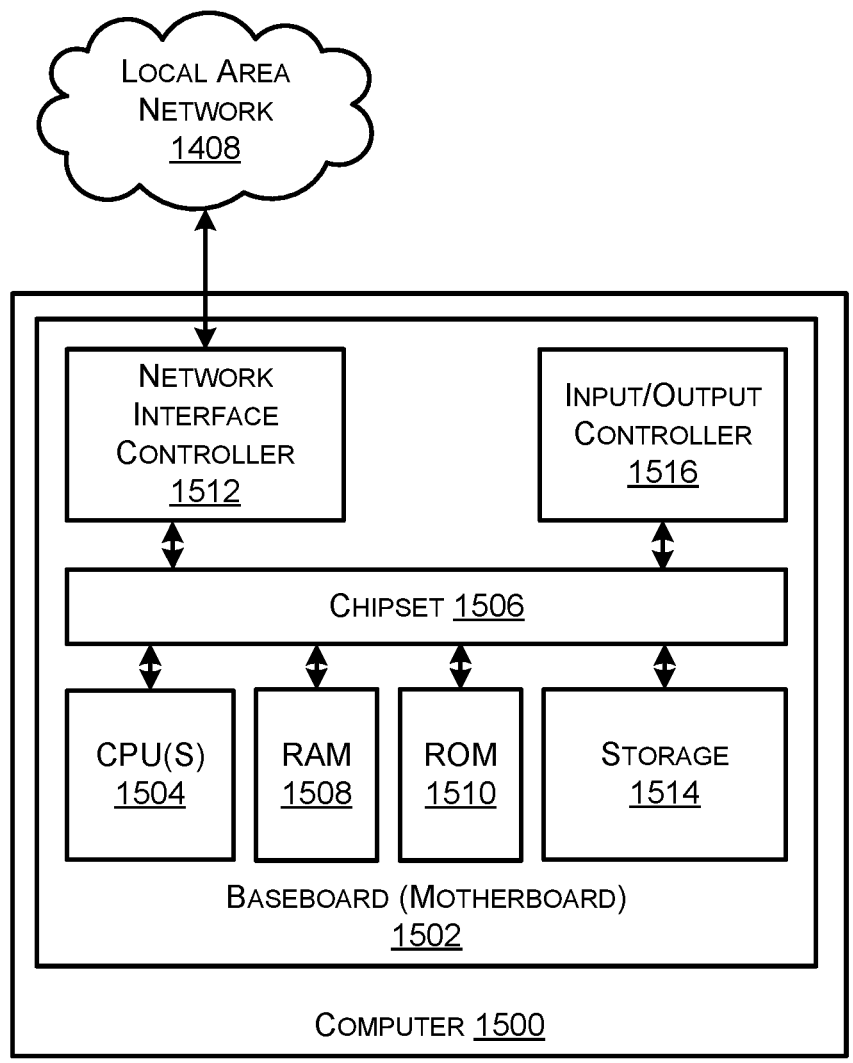
FIG. 15 is a computer architecture diagram showing an illustrative computer hardware architecture for implementing a computing device that can be utilized to implement aspects of the various technologies presented herein.

FIG. 15 shows an example computer architecture for a computer 1500 capable of executing program components for implementing the functionality described above. The computer architecture shown in FIG. 15 illustrates a conventional server computer, workstation, desktop computer, laptop, tablet, network appliance, e-reader, smartphone, or other computing device, and can be utilized to execute any of the software components presented herein.

The computer 1500 includes a baseboard 1502, or "motherboard," which is a printed circuit board to which a multitude of components or devices can be connected by way of a system bus or other electrical communication paths. In one illustrative configuration, one or more central processing units ("CPUs") 1504 operate in conjunction with a chipset 1506. The CPUs 1504 can be standard programmable processors that perform arithmetic and logical operations necessary for the operation of the computer 1500.

The CPUs 1504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 1506 provides an interface between the CPUs 1504 and the remainder of the components and devices on the baseboard 1502. The chipset 1506 can provide an interface to a RAM 1508, used as the main memory in the computer 1500. The chipset 1506 can further provide an interface to a computer-readable storage medium such as a read-only memory ("ROM") 1510 or non-volatile RAM ("NVRAM") for storing basic routines that help to startup the computer 1500 and to transfer information between the various components and devices. The ROM 1510 or NVRAM can also store other software components necessary for the operation of the computer 1500 in accordance with the configurations described herein.

The computer 1500 can operate in a networked environment using logical connections to remote computing devices and computer systems through a network, such as the network 1508. The chipset 1506 can include functionality for providing network connectivity through a network interface controller (NIC) 1512, such as a gigabit Ethernet adapter. The NIC 1512 is capable of connecting the computer 1500 to other computing devices over the network 1408 (or 122). It should be appreciated that multiple NICs 1512 can be present in the computer 1500, connecting the computer to other types of networks and remote computer systems.

The computer 1500 can include storage 1514 (e.g., disk) that provides non-volatile storage for the computer. The storage 1514 can consist of one or more physical storage units. The storage 1514 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1500 can further read information from the storage 1514 by detecting the physical states or characteristics of one or more particular locations within the physical storage units.

In addition to the storage 1514 described above, the computer 1500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1500. In some examples, the operations performed by the cloud system 102, and or any components included therein, may be supported by one or more devices similar to computer 1500. Stated otherwise, some or all of the operations performed by the cloud system 102, and or any components included therein, may be performed by one or more computer devices 1500 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1514 can store an operating system utilized to control the operation of the computer 1500. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1514 can store other system or application programs and data utilized by the computer 1500.

In one embodiment, the storage 1514, RAM 1508, ROM 1510, and/or other computer-readable storage media may be encoded with computer-executable instructions which, when loaded into the computer 1500, transform the computer from a general-purpose computing system into a special-purpose computer capable of implementing the embodiments described herein. These computer-executable instructions transform the computer 1500 by specifying how the CPUs 1504 transition between states, as described above. According to one embodiment, the computer 1500 has access to computer-readable storage media storing computer-executable instructions which, when executed by the computer 1500, perform the various techniques described above. The computer 1500 can also include computer-readable storage media having instructions stored thereupon for performing any of the other computer-implemented operations described herein.

The computer 1500 can also include one or more input/output controllers 1516 for receiving and processing input from a number of input devices, such as a keyboard, a mouse, a touchpad, a touch screen, an electronic stylus, or other type of input device. Similarly, an input/output controller 1516 can provide output to a display, such as a computer monitor, a flat-panel display, a digital projector, a printer, or other type of output device. It will be appreciated that the computer 1500 might not include all of the components shown in FIG. 15, can include other components that are not explicitly shown in FIG. 15, or might utilize an architecture completely different than that shown in FIG. 15.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at a cloud system for activating licensed applications that is running in the cloud system, the method comprising:
    receiving an enrollment request for a license manager to manage licensed application instances on behalf of a user account registered with the cloud system;
    provisioning, by the license manager, a virtual computing resource in the user account to run a licensed application instance;
    configuring the licensed application instance to send activation requests to an activation firewall that allows or denies activation requests;
    sending, by the licensed application instance, an activation request from the virtual computing resource and to the activation firewall;
    determining that the activation request was sent from the virtual computing resource;
    determining that the virtual computing resource was provisioned in the user account by the license manager; and
    in response to determining that the virtual computing resource was provisioned by the license manager, forwarding the activation request from the activation firewall and to an activation server that activates licensed applications for use.

2. The method of claim 1, further comprising:
   determining, at the activation firewall, a unique product code that is assigned to the licensed application instance; and
   identifying, using a mapping stored at the activation firewall, a private Domain Name System (DNS) name that is mapped to the unique product code, the private DNS name being associated with the activation server,
   wherein the activation request is forwarded to the private DNS name.

3. The method of claim 1, wherein determining that the activation request was sent from the virtual computing resource comprises:
   extracting, by the activation firewall, metadata from the activation request indicating that the virtual computing resource is a source of the activation request;
   sending, to a computing service of the cloud system, the metadata in a request to verify that the virtual computing resource was provisioned by the license manager; and
   receiving a response that verifies that the virtual computing resource was provisioned by the license manager.

4. The method of claim 1, further comprising:
   provisioning the activation firewall and the activation server in an activation virtual private cloud (VPC) of the cloud system;
   providing a VPC endpoint service associated with the activation VPC that accepts activation request on behalf of the activation firewall;
   establishing a connection between the VPC endpoint service and a user VPC endpoint associated with a VPC of the user account in which the licensed application instance is running.

5. A cloud system comprising:
   one or more processors; and
   one or more computer-readable media storing computer-executable instructions that, when executed by the one or more processors, cause the cloud system to perform operations comprising:
      provisioning, by a license manager, a virtual computing resource in a user account to run a licensed application instance, wherein the licensed application instance is inactivated;
      sending, by the licensed application instance, an activation request from the virtual computing resource and to an activation firewall that allows or denies activation requests to be sent to an activation server;
      determining that the virtual computing resource was provisioned by the license manager; and
      in response to determining that the virtual computing resource was provisioned by the license manager, forwarding the activation request from the activation firewall and to an activation server that activates licensed applications for use.

6. The cloud system of claim 5, the operations further comprising:
   establishing a connection between the licensed application instance on the virtual computing resource and the activation server; and
   receiving, at the licensed application instance and via the connection, an activation response from the activation server that activates the licensed application instance.

7. The cloud system of claim 5, the operations further comprising:
   configuring, by the license manager, the licensed application instance to send activation requests to the activation firewall; and
   sending a command to the licensed application instance that causes the licensed application instance to send the activation request.

8. The cloud system of claim 5, the operations further comprising:
   determining, at the activation firewall, a unique product code that is assigned to the licensed application instance; and
   identifying, using a mapping stored at the activation firewall, a private Domain Name System (DNS) name that is mapped to the unique product code, the private DNS name being associated with the activation server,
   wherein the activation request is forwarded to the private DNS name.

9. The cloud system of claim 5, the operations further comprising:
   extracting, by the activation firewall, metadata from the activation request indicating that the virtual computing resource is a source of the activation request;
   sending, to a computing service of the cloud system, the metadata in a request to verify that the virtual computing resource was provisioned by the license manager; and
   receiving a response that verifies that the virtual computing resource was provisioned by the license manager.

10. The cloud system of claim 9, wherein the metadata includes:
    an account identifier (ID) of the user account;
    a private Internet Protocol (IP) address associated with virtual computing resource; and
    a virtual private cloud (VPC) ID of a VPC in which the virtual computing resource is provisioned.

11. The cloud system of claim 9, the operations further comprising:
    provisioning the activation firewall and the activation server in an activation virtual private cloud (VPC) of the cloud system;
    providing a VPC endpoint service associated with the activation VPC that accepts activation request on behalf of the activation firewall;
    establishing a connection between the VPC endpoint service and a user VPC endpoint associated with a VPC of the user account in which the licensed application instance is running.

12. The cloud system of claim 5, wherein the activation firewall is a containerized service with a plurality of firewall instances that each filter activation requests, further comprising:
    a network load balancer that receives and distributes the activation requests amongst the plurality of firewall instances.

13. The cloud system of claim 12, the operations further comprising:
    determining, at the network load balancer, connection information associated with a connection used by the virtual computing instance to send the activation request; and
    prepending, using a proxy protocol, the connection information in a packet packer header associated with the activation request such that the connection information is communicated to the activation server along with the activation request.

14. A method performed at least partly by an activation firewall in a cloud system, comprising:
    receiving, at the activation firewall, an activation request to activate a licensed application instance running on a virtual computing resource, the virtual computing resource running in a user account registered with the cloud system;

determining, at the activation firewall, that the activation request was sent from the virtual computing resource;

determining whether the virtual computing resource was provisioned by a license manager of the cloud system; and in response to determining that the virtual computing resource was provisioned by the license manager, forwarding the activation request to an activation server; or in response to determining that the virtual computing resource was not provisioned by the license manager, dropping the activation request.

15. The method of claim 14, further comprising:
establishing a connection between the licensed application instance on the virtual computing resource and the activation server;
receiving, at the activation firewall and via the connection, an activation response from the activation server that activates the licensed application instance; and
forwarding the activation response to the virtual computing resource.

16. The method of claim 14, further comprising:
determining, at the activation firewall, a unique product code that is assigned to the licensed application instance; and
identifying, using a mapping stored at the activation firewall, a private Domain Name System (DNS) name that is mapped to the unique product code, the private DNS name being associated with the activation server,
wherein the activation request is forwarded to the private DNS name.

17. The method of claim 14, further comprising determining that the activation request was sent from the virtual computing resource by:
extracting, by the activation firewall, metadata from the activation request indicating that the virtual computing resource is a source of the activation request;
sending, to a computing service of the cloud system, the metadata in a request to verify that the virtual computing resource was provisioned by the license manager; and
receiving a response that verifies that the virtual computing resource was provisioned by the license manager.

18. The method of claim 17, wherein the metadata includes:
an account identifier (ID) of the user account;
a private Internet Protocol (IP) address associated with virtual computing resource; and
a virtual private cloud (VPC) ID of a VPC in which the virtual computing resource is provisioned.

19. The method of claim 14, wherein:
the activation firewall an instance of a containerized service with a plurality of firewall instances that each filter activation requests; and
the activation request was received from a network load balancer that receives and distributes the activation requests amongst the plurality of firewall instances.

20. The method of claim 14, further comprising:
configuring, by the license manager, the licensed application instance to send activation requests to the activation firewall; and
sending a command to the licensed application instance that causes the licensed application instance to send the activation request.

* * * * *